United States Patent
Zhang

(10) Patent No.: US 10,658,911 B2
(45) Date of Patent: May 19, 2020

(54) SWITCHED RELUCTANCE MOTOR AND APPLICATION THEREOF

(71) Applicant: ZHENGZHOU JITIAN PATENT OPERATION CO., LTD., Zhengzhou, Henan (CN)

(72) Inventor: Chun Zhang, Henan (CN)

(73) Assignee: ZHENGZHOU JITIAN PATENT OPERATION CO., LTD., Zhengzhou, Henan (CN)

( * ) Notice: Subject to any disclaimer, the term of this patent is extended or adjusted under 35 U.S.C. 154(b) by 25 days.

(21) Appl. No.: 16/077,700

(22) PCT Filed: Feb. 13, 2017

(86) PCT No.: PCT/CN2017/073440
§ 371 (c)(1),
(2) Date: Aug. 13, 2018

(87) PCT Pub. No.: WO2017/137011
PCT Pub. Date: Aug. 17, 2017

(65) Prior Publication Data
US 2019/0036431 A1      Jan. 31, 2019

(30) Foreign Application Priority Data

Feb. 13, 2016  (WO) ................ PCT/CN2016/073744
Dec. 31, 2016  (CN) ............................ 2016 1 1268381
Feb. 8, 2017   (CN) ............................ 2017 1 0069979

(51) Int. Cl.
*H02K 19/00*   (2006.01)
*H02K 19/10*   (2006.01)
(Continued)

(52) U.S. Cl.
CPC ............. *H02K 19/103* (2013.01); *B60K 6/00* (2013.01); *B60K 17/145* (2013.01);
(Continued)

(58) Field of Classification Search
CPC ...... H02K 19/103; H02K 1/148; H02K 1/246; H02K 7/14; H02K 29/03; H02K 2201/06;
(Continued)

(56) References Cited

U.S. PATENT DOCUMENTS 4,758,132 A * 7/1988 Hartwig .................... F01C 1/16
                                                                310/67 R
6,481,975 B1 * 11/2002 Pais ....................... F04C 15/008
                                                                417/356
(Continued)

FOREIGN PATENT DOCUMENTS

CN         1303165 A         7/2001
CN         102035319 A       4/2011
(Continued)

OTHER PUBLICATIONS

International Search Report (English and Chinese) and Written Opinion issued in PCT/CN2017/073440 completed Apr. 11, 2017, 10 pages.

(Continued)

*Primary Examiner* — Paul N Dickson
*Assistant Examiner* — Hilary L Johns
(74) *Attorney, Agent, or Firm* — Hamre, Schumann, Mueller & Larson, P.C.

(57) ABSTRACT

The present invention belongs to the field of motors, and specifically relates to a switched reluctance motor of a novel structure. The switched reluctance motor includes stator tooth poles and rotor tooth poles, the rotor tooth poles are in rotation fit relative to the stator tooth poles, wherein the number of the stator tooth poles is twice as large as that of the rotor tooth poles; the stator tooth poles are fixedly connected in layers along the direction of a rotation axis, the stator tooth pole with thickness corresponding to the thickness range of the rotor tooth pole is called a rotor tooth pole (Continued)

unit, the stator tooth pole is composed of a stator tooth pole iron core and a stator tooth pole coil sleeved at the outside of the stator tooth pole iron core, an end part of the stator tooth pole iron core forming an air gap with the rotor tooth pole is a concave-convex fit circular arc surface, the cooperation relationship between the stator tooth pole and the rotor tooth pole is that no matter the rotor tooth pole rotates to any angle relative to the stator tooth pole, the center line of at least one layer of stator tooth poles forms an included angle $\alpha$ with the center line of the corresponding rotor tooth pole unit, $0<\alpha\leq\beta$, $\beta$ is an angle of a center of the circle corresponding to the circular arc of a cross section of the stator tooth pole iron core or the rotor tooth pole along the direction of the rotation axis.

4 Claims, 22 Drawing Sheets

(51) Int. Cl.
| | | |
|---|---|---|
| *F04C 2/16* | (2006.01) | |
| *H02K 29/03* | (2006.01) | |
| *H02K 1/14* | (2006.01) | |
| *H02K 1/24* | (2006.01) | |
| *B60K 6/00* | (2006.01) | |
| *B60K 17/14* | (2006.01) | |
| *B60K 17/356* | (2006.01) | |
| *H02K 7/14* | (2006.01) | |

(52) U.S. Cl.
CPC .............. *B60K 17/356* (2013.01); *F04C 2/16* (2013.01); *F04C 2/165* (2013.01); *H02K 1/148* (2013.01); *H02K 1/246* (2013.01); *H02K 7/14* (2013.01); *H02K 29/03* (2013.01); *H02K 2201/06* (2013.01); *H02K 2213/03* (2013.01); *Y02T 10/7258* (2013.01)

(58) Field of Classification Search
CPC .... H02K 2213/03; B60K 6/00; B60K 17/145; B60K 17/356; F04C 2/16; F04C 2/165; Y02T 10/7258
USPC ........................................................ 180/65.1
See application file for complete search history.

(56) References Cited

U.S. PATENT DOCUMENTS

| | | | |
|---|---|---|---|
| 2005/0062354 A1* | 3/2005 | Iles-Klumpner | H02K 1/276 310/156.53 |
| 2012/0280587 A1 | 11/2012 | Flynn | |
| 2014/0062379 A1* | 3/2014 | Dai | H02P 25/08 318/701 |

FOREIGN PATENT DOCUMENTS

| | | |
|---|---|---|
| CN | 103762780 A | 4/2014 |
| JP | 5543185 B2 | 7/2014 |

OTHER PUBLICATIONS

International Search Report (English and Chinese) and Written Opinion issued in PCT/CN2016/073744 completed Oct. 27, 2016, 9 pages.

\* cited by examiner

SWITCHED RELUCTANCE MOTOR AND APPLICATION THEREOF

FIELD OF THE INVENTION

The present invention belongs to the field of motors, and specifically relates to a switched reluctance motor of a novel structure, and an application thereof.

BACKGROUND OF THE INVENTION

A switched reluctance drive (Switched Reluctance Drive: SRD) system is the latest generation of stepless speed control system developed after a variable frequency speed control system and a brushless DC motor speed control system, and it is an optical, mechanical and electrical integrated high-tech integrating the modern microelectronics technology, the digital technology, the power electronics technology, the infrared photoelectric technology and the modern electromagnetic theory.

A switched reluctance motor speed control system is mainly composed of four parts: a switched reluctance motor (SRM), a power converter, a controller and a rotor position detector. The controller includes a control circuit and the power converter, and the rotor position detector is installed at one end of the motor.

The switched reluctance motor (SRM) used in the switched reluctance motor speed control system is a component that realizes electromechanical energy conversion in the SRD, and it is also the main sign of the SRD that is different from other motor drive systems. Salient poles of a stator and a rotor of a double-salient-pole variable reluctance motor of the existing SRM system are formed by laminating ordinary silicon steel sheets. The rotor has neither winding nor permanent magnet, a concentrated winding is twined on the stator pole, two radial opposite windings are connected together and are called "one phase", the SR motor can be designed into a variety of different phase number structures, and the poles of the stator and the rotor have a variety of different combinations. A large number of phases and a small step angle are conducive to reducing the torque ripple, but the structure is complicated, and there are many main switching devices, the cost is high, and a four-phase (8/6) structure and a three-phase (12/8) structure are mainly applied at present.

A switched reluctance motor transmission system combines the advantages of an induction motor transmission system and a DC electric vehicle motor transmission system and is a powerful contender for these transmission systems. Its main advantages are as follows:

1. The switched reluctance motor has a larger motor utilization factor, which may be 1.2 to 1.4 times as large as an induction motor utilization factor. 2. The structure of the motor is simple, and no winding in any form is twined on the rotor; only the simple concentrated winding is twined on the stator, the end part is relatively short, and there is no inter-phase jumper. Therefore, the switched reluctance motor has the characteristics of less manufacturing procedures, low cost, reliable work, small maintenance load and the like. 3. The torque of the switched reluctance motor has nothing to do with the polarity of the current, only one-way current excitation is needed, only one switching element is used by each phase in a power conversion circuit ideally and is connected with a motor winding in series, thus having no feedthrough risk of two switching elements just like a PWM inverter power supply. Therefore, the switched reluctance motor drive system SED is simple in circuit and high in reliability, and has a lower cost than a PWM AC speed control system. 4. The structural form of the rotor of the switched reluctance motor has a small rotating speed limitation and can be made into a motor with a high rotating speed, furthermore, the rotational inertia of the rotor is small, and the size and the direction of a phase torque can be changed at any time when the phase of the current changes every time, so that the system has good dynamic response. 5. The SRD system can achieve mechanical characteristics satisfying different load requirements by controlling the turn-on and turn-off of the current and controlling the amplitude, it is easy to implement functions such as soft start, four-quadrant operation and the like of the system, and the control is flexible. Further, as the SRD system runs as a self-synchronizing system, it does not suffer from instability and oscillation problems at low frequencies just like a variable frequency power supply induction motor. 6. Since the SR switched reluctance motor adopts a unique structure, a design method and corresponding control techniques, the unit processing thereof can be comparable to that of the induction motor, and even has slight advantages. The efficiency and the power density of the SRD system can be maintained at a teaching level within a wide speed and load range.

The main disadvantages of the switched reluctance motor drive system are as follows:

1. There is torque ripple. It can be seen from the working principle that, the torque generated on the rotor of the S switched reluctance motor is formed by the superposition of a series of pulse torques, due to the influence of the double-salient-pole structure and the saturation nonlinearity of the magnetic circuit, the synthetic torque is not a constant torque, but has a certain harmonic component, which affects the low speed running performance of the SR motor; 2. The noise and vibration of the SR motor drive system are larger than those of a general motor.

The above disadvantages are essentially caused by the structure of the switched reluctance motor SRM of the switched reluctance motor drive system, that is, the SRD system. To reduce the torque ripple and the noise and vibration caused accordingly, the structure of the switched reluctance motor SRM must be changed.

A three-screw pump is formed by a pump body and screws, when a driving screw rotates, it drives a driven screw engaged with the driving screw to rotate together, a screw engagement space volume at one end of a suction cavity gradually increases, and the pressure decreases.

The Concept of the Three-Screw Pump

The liquid enters the engagement space volume under the action of a pressure difference. When the volume is increased to the maximum to form a sealed cavity, the liquid continuously moves in the sealed cavity along the axial direction until being discharged from one end of a discharge cavity. At this time, the screw engagement space volume at one end of the discharge cavity is gradually reduced to discharge the liquid. The working principle of the three-screw pump is similar to that of a gear pump, except that gears are replaced with the screws on the structure. The table shows the characteristics and the application ranges of various screw pumps. The three-screw pump has small flow and pressure pulses, little noise and vibration, and self-priming capability, but screw machining is difficult. The pump has two types of structures, namely, single suction and double suction, but a single-screw pump only has the single suction structure. The three-screw pump must be equipped with a safety valve (the single-screw pump does not have to be equipped) to prevent the output pressure of the pump from exceeding an admissible value due to some reasons, such as blockage of a discharge pipe, resulting in damage to the pump or a prime motor.

The Structure of the Three-Screw Pump

The three-screw pump suctions and discharges the liquid by using the rotation of the screws. The middle screw is the driving screw, which is driven by the prime motor to rotate, and the screws on the two sides are driven screws, which reversely rotate with the driving screw. The threads of the driving screw and the driven screws are double-ended threads.

The three-screw pump is a screw type positive displacement pump. In the three-screw pump, due to the mutual engagement of spiral grooves on the driving screw and the driven screws and their cooperation with inner surfaces of three holes of a bushing, several dynamic sealed chambers are formed between the inlet and the outlet of the pump, these dynamic sealed chambers continuously cause the liquid to move from the inlet to the outlet of the pump along the axial direction and cause the pressure of the conveyed liquid to gradually increase level by level. Therefore, continuous, smooth and axially moving pressure fluid is formed. The liquid conveyed by the three-screw pump is lubricating liquid free of solid particles, non-corrosive oil and substances similar to oil, the viscosity is 1.2-100 oE (3.0-760 cst), the high-viscosity liquid can also be conveyed after heating and viscosity reduction, and its temperature does not exceed 150° C.

Due to the mutual engagement of the screws and the close fit of the screws with the inner wall of the bushing, the space between a suction opening and a discharge opening of the pump is divided into one or more sealed spaces. With the rotation and engagement of the screws, these sealed spaces are continuously formed at the suction side of the pump to seal the liquid in the suction chamber, and the liquid is continuously pushed to the discharge end in the suction chamber along the axial direction of the screws, the liquid sealed in the spaces is continuously discharged, just like the situation that a nut is continuously pushed forward during the rotation of the threads, wherein the circles of the threads are seen as the liquid, when the screw rotates, the threads rotate, which is equivalent to the situation of the liquid in the screw pump, and this is the basic working principle of the screw pump.

From the characteristic that the driven screw is driven by the hydraulic force of the medium in the sealed chamber to rotate, it can be seen that the operation of the cycloid meshed three-screw pump is also reversible, moreover, since the screw diameter is small, the gyroscopic moment can be reduced, and the flywheel effect is very small, so that a full-load torque can be immediately generated during the startup, fast turning can be achieved, and the noise is small as well. The full-load continuous start (stopping and restarting) is performed on the high-pressure three-screw pump for more than 10 times per minute. When the pump is stopped, due to the back flow of the high pressure medium, the pump immediately rotates reversely, and the pump rotates reversely when the pump is restarted, the action is free, and the operation is reliable. Therefore, if the medium of a pressure source is input into the pump, the three-screw pump becomes a hydraulic motor. At this time, the three-screw pump becomes the prime motor. The only difference between the hydraulic motor and the three-screw pump lies in the interchange of the inlet and outlet. The hydraulic motor pumps the high-pressure medium into the pump, and the three-screw pump discharges the high-pressure medium from the pump, therefore the rotation directions thereof are reverse. The efficiency of such hydraulic motor will still remain high within a considerable load range. A pump, with a large helix angle of the screw, namely, a pump with a large helical pitch, is preferably used as the hydraulic motor.

As new energy technologies become more sophisticated, the drive system has achieved technological breakthrough. At present, the mainstream new energy vehicle models use parallel and series-parallel hybrid power systems. Through the analysis and distribution of engine and motor characteristics and efficiency ranges, the energy is efficiently used and recovered, thereby improving the overall system efficiency.

In the prior art, with the continuous advancement of science and technology, the new energy technology has become more widely used in public facilities. Currently, the new energy technology is widely used in public vehicles. However, the parallel and series-parallel structure is very complicated and is very troublesome to produce and manufacture.

Moreover, there are currently oil-liquid hybrid systems, oil-electric hybrid systems and electric-liquid hybrid systems, but no system in which hydraulic power generated by electricity is mixed with electricity is available. The existing motor and the hydraulic motor are separately arranged, the hydraulic motor and the hydraulic pump can be mixed for use, and the hydraulic motor and the motor are never mixed together.

SUMMARY OF THE INVENTION

The present invention aims at solving the technical problem of vibration and noise caused by the torque ripple of an existing switched reluctance motor SRM and the limitation to the use of the motor SRM due to the vibration and the noise.

The present invention provides a switched reluctance motor SRM of a brand new structure, specifically, a switched reluctance motor, including stator tooth poles and rotor tooth poles, wherein the rotor tooth poles are in rotation fit relative to the stator tooth poles, the tooth number of the stator tooth pole is 2 m, and the tooth number of the rotor tooth pole is m; the stator tooth poles are fixedly connected in layers along the direction of a rotation axis, the number of each layer of tooth poles is the number of tooth poles, the stator tooth pole with thickness corresponding to the thickness range of the rotor tooth pole is called a rotor tooth pole unit, the stator tooth pole is composed of a stator tooth pole iron core and a stator tooth pole coil sleeved at the outside of the stator tooth pole iron core, an end part of the stator tooth pole iron core forming an air gap with the rotor tooth pole is a concave-convex fit circular arc surface, the cooperation relationship between the stator tooth pole and the rotor tooth pole is that no matter the rotor tooth pole rotates to any angle relative to the stator tooth pole, the center line of at least one layer of stator tooth pole forms an included angle α with the center line of the corresponding rotor tooth pole unit, $0<α≤β$, $β$ is an angle of a center of the circle corresponding to the circular arc of a cross section of the stator tooth pole iron core or the rotor tooth pole along the direction of the rotation axis, and $β<360/2$ m. By satisfying $β<360/2$ m, a gap can be formed between the circular arc surfaces of the adjacent stator tooth pole iron cores arranged around the circumference, the gap avoids the generation of a magnetic short circuit between the circular arc surfaces of the adjacent stator tooth pole iron cores. A gap is also formed between the stator tooth poles along the direction of the rotation axis, and the gap avoids the generation of a magnetic short circuit between the circular arc surfaces of the adjacent stator tooth pole iron cores.

In the switched reluctance motor, no matter the rotor tooth pole rotates to any angle relative to the stator tooth pole, the center line of at least one layer of stator tooth pole forms an included angle α with the center line of the rotor tooth pole of the corresponding rotor tooth pole unit, 0<α≤β, the number of layers of the stator tooth pole is n, the corresponding rotor tooth pole unit has a thickness of n layers, the number of tooth poles of the rotor tooth poles arranged along the circumference is m, assuming that the included angle between the first layer of stator tooth pole and the center line of the rotor tooth pole is 360/(nm), then the included angle of the second layer is 2*360/(nm), . . . and the included angle on the nth layer is n*360/(nm), wherein 360/(nm)≤β.

In the switched reluctance motor, in an xyz coordinate system, the plane where the first layer of stator tooth pole is located is an xy plane, the axial line direction of the rotation axis is a z axis direction, the other layers of stator tooth poles extend along the z axis in turn, the included angle between the center line of the first layer of stator tooth pole and the y axis is 360/(nm), the included angle of the second layer is 2*360/(nm), . . . the included angle on the nth layer is n*360/(nm), and the center lines of the rotor tooth poles of the various layers of rotor tooth pole units are overlapped on the z direction.

In the switched reluctance motor, in the xyz coordinate system, the plane where the first layer of stator tooth pole is located is the xy plane, the axial line direction of the rotation axis is the z axis direction, the other layers of stator tooth poles extend along the z axis in turn, the center lines of the various layers of stator tooth poles are overlapped with the y axis on the z direction, then the included angles between the center lines of the rotor tooth poles of the first layer of rotor tooth pole unit and the y axis are 360/(nm), the included angle of the second layer is 2*360/(nm), and . . . the included angle on the nth layer is n*360/(nm).

In the switched reluctance motor, in the xyz coordinate system, the plane where the first layer of stator tooth pole is located is the xy plane, the axial line direction of the rotation axis is the z axis direction, the other layers of stator tooth poles extend along the z axis in turn, the included angle between the center line of the first layer of stator tooth pole and the y axis is 360/(2*nm), the included angle of the second layer is 2*360/(2*nm), and . . . the included angle on the nth layer is n*360/(2*nm); and the included angles between the center lines of the rotor tooth poles of the first layer of rotor tooth pole unit and the y axis are −360/(2*nm), the included angle of the second layer is −2*360/(2*nm), and . . . the included angle on the nth layer is −n*360/(2*nm), so that reverse spiral is formed.

In the switched reluctance motor, the various layers of the stator tooth poles extend along the z axis in turn to form a straight strip-shaped stator tooth pole or a spiral strip-shaped stator tooth pole, and the rotor tooth pole corresponding to the straight strip-shaped stator tooth pole is a spiral strip-shaped rotor tooth pole; and the rotor tooth pole corresponding to the spiral strip-shaped stator tooth pole is a reverse spiral strip-shaped rotor tooth pole or a straight strip-shaped rotor tooth pole, the number of tooth poles is m, which is a natural number greater than or equal to 1, and n is a natural number greater than or equal to 2. In the switched reluctance motor, a yoke of the straight strip-shaped stator tooth pole or the spiral strip-shaped stator tooth pole is correspondingly connected by a straight strip-shaped permeability magnetic material or a spiral strip-shaped permeability magnetic material to form a straight strip-shaped serial U-shaped electromagnet or a spiral strip-shaped serial U-shaped electromagnet.

In the switched reluctance motor, the circular arc surface of the straight strip-shaped stator tooth pole or the spiral strip-shaped stator tooth pole points to the center of the circle to form an outer straight strip-shaped stator tooth pole or an outer spiral strip-shaped stator tooth pole; and the straight strip-shaped rotor tooth pole, the spiral strip-shaped rotor tooth pole and the reverse spiral strip-shaped rotor tooth pole are correspondingly inner straight strip-shaped rotor tooth pole, inner spiral strip-shaped rotor tooth pole and inner reverse spiral strip-shaped rotor tooth pole.

In the switched reluctance motor, the circular arc surface of the straight strip-shaped stator tooth pole or the spiral strip-shaped stator tooth pole deviates from the center of the circle to form an inner straight strip-shaped stator tooth pole or an inner spiral strip-shaped stator tooth pole; and the straight strip-shaped rotor tooth pole, the spiral strip-shaped rotor tooth pole and the reverse spiral strip-shaped rotor tooth pole are correspondingly outer straight strip-shaped rotor tooth pole, outer spiral strip-shaped rotor tooth pole and outer reverse spiral strip-shaped rotor tooth pole.

In the switched reluctance motor, the yokes of each layer of stator tooth pole are connected by the permeability magnetic material to form a closed framework stator tooth pole, and a framework coil is sleeved on a permeability magnetic material framework between the stator tooth poles.

In the switched reluctance motor, the circular arc surface of the closed framework stator tooth pole points to the center of the circle to form an outer closed framework stator tooth pole; and the straight strip-shaped rotor tooth pole, the spiral strip-shaped rotor tooth pole and the reverse spiral strip-shaped rotor tooth pole are correspondingly inner straight strip-shaped rotor tooth pole, inner spiral strip-shaped rotor tooth pole and inner reverse spiral strip-shaped rotor tooth pole.

In the switched reluctance motor, the circular arc surface of the closed framework stator tooth pole deviates from the center of the circle to form an inner closed framework stator tooth pole; and the straight strip-shaped rotor tooth pole, the spiral strip-shaped rotor tooth pole and the reverse spiral strip-shaped rotor tooth pole are correspondingly outer straight strip-shaped rotor tooth pole, outer spiral strip-shaped rotor tooth pole and outer reverse spiral strip-shaped rotor tooth pole.

In the switched reluctance motor, the m is an even number, the yokes of each layer of stator tooth pole are connected by the permeability magnetic material to form the closed framework stator tooth pole, after the framework coil is sleeved on the permeability magnetic material framework between the stator tooth poles, the yoke of the straight strip-shaped stator tooth pole or the spiral strip-shaped stator tooth pole is connected by the corresponding straight strip-shaped permeability magnetic material or the spiral strip-shaped permeability magnetic material, and the straight strip-shaped permeability magnetic material or the spiral strip-shaped permeability magnetic material serve as a yoke to sleeve a straight strip-shaped yoke or a spiral strip-shaped yoke to form a three-dimensional straight strip-shaped stator tooth pole or a spiral strip-shaped stator tooth pole stator.

According to the stator tooth pole of the switched reluctance motor, the shape of the stator tooth pole is a straight tooth or a spiral tooth.

A composite pump of a three-screw pump and a spiral rotor switched reluctance motor includes the three-screw pump, at least one of three screws of the three-screw pump is a spiral rotor of the spiral rotor switched reluctance motor, a bushing of the three-screw pump corresponding to the spiral rotor is a stator bushing formed by a stator of the spiral rotor switched reluctance motor, and the spiral rotor and the stator bushing constitute the spiral rotor switched reluctance motor.

Synchronous gears are arranged among the three screws.

A thin rubber layer is arranged on an outer surface of the screw.

The three screws are double-ended threads to four-ended threads.

If the middle screw among the three screws is the spiral rotor, then the middle screw is a driving screw.

If two screws on both sides among the three screws are spiral rotors, then the two screws on both sides are driving screws.

If the three screws are spiral rotors, then the three screws are driving screws.

Synchronous gears for supporting the bearings of the three screws and the three screws are arranged at the outside of a working cavity formed by the screws and the bushing.

An electric vehicle using the composite pump of the three-screw pump and the spiral rotor switched reluctance motor, wherein the composite pump serves as a wheel side motor of the electric vehicle, and the wheel side motors communicate with each other through oil circuits, so that the wheel side motors can transfer energy to each other through the oil circuit.

The wheel side motor is a front drive or a rear drive of the electric vehicle, and two wheel side motors of the front drive or the rear drive communicate with an oil storage tank and an energy storage tank through oil circuits; by means of valve control, (1) two wheel side motors are placed between the oil storage tank and the energy storage tank after being connected in parallel, and the three components are connected in series, so that the energy is stored during braking, and the energy is released during startup or acceleration; (2) after the two wheel side motors are connected in series, the two ends are respectively connected with the oil storage tank and the energy storage tank in series, so that the energy is stored during braking, and the energy is released during startup or acceleration; and (3) the two wheel side motors are connected in series circularly, namely, the heads and tails of the two wheel side motors are connected with each other.

The wheel side motors are wheel side motors of a four-wheel-drive electric vehicle, four wheel side motors communicate with the oil storage tank and the energy storage tank through oil circuits, by means of valve control, (1) the four wheel side motors are connected in parallel circularly and are disconnected with the oil storage tank and the energy storage tank; (2) any three wheel side motors are circularly connected with the other wheel side motor in series after being connected in parallel and are disconnected with the oil storage tank and the energy storage tank; (3) the four wheel side motors constitute a bridge circuit, constitute circulation and are disconnected with the oil storage tank and the energy storage tank; and (4) the four wheel side motors are connected in series or any three wheel side motors are connected with the other wheel side motor in series after being connected in parallel, or the four wheel side motors are placed between the oil storage tank and the energy storage tank after constituting the bridge circuit, and the three components are connected in series, so that the energy is stored during braking, and the energy is released during startup or acceleration.

A two-way double-screw pump motor includes a first spiral strip-shaped rotor switched reluctance motor, the rotor of the first spiral strip-shaped rotor switched reluctance motor is used as a first driving screw of a double-screw pump, an annular stator side opening portion of the motor and the first driving screw cooperate with another screw to constitute the two-way double-screw pump motor, and the stator is filled with resin to form a circular ring inner surface.

The other screw is the rotor of a second spiral strip-shaped rotor switched reluctance motor and serves as a second driving screw, a corresponding side of the second spiral strip-shaped rotor switched reluctance motor is open, so that the first driving screw is engaged with the second driving screw, that is, the spiral direction of the second driving screw is opposite to the spiral direction of the first driving screw.

The other screw is a driven screw.

The number of tooth poles of the spiral strip-shaped rotor switched reluctance motor is one of 1-8 tooth poles, and gears engaged with each other are arranged on the end parts of the two screws.

In an electric vehicle, the double-screw pump motor is used as a wheel side motor of the electric vehicle, and the motors are connected through oil circuits, so that the motors can transfer energy to each other through the two-way double-screw pump.

The two-way double-screw pump motor is one of a front drive, a rear drive or a four-wheel drive of the electric vehicle.

The two-way double-screw pumps between electric vehicle motors are connected in series through the oil circuits to realize the mutual transmission of energy, the serial connection mode between the two-way double-screw pumps is as follows: the output end of the first motor is connected with the input end of the next motor through an oil circuit and then is connected in series in turn, and the output end of the last motor is connected with the input end of the first motor through an oil circuit; an oil storage tank and an energy storage tank are connected on a branch oil circuit between the two motors, an oil inlet pipe and an oil outlet pipe, which are connected with the oil circuit, are arranged on the oil storage tank, and an energy storage pipe and an energy release pipe, which are connected with the oil circuit, are arranged on the energy storage tank; the forward direction during the circulation of the oil circuit is used as the front direction, the oil outlet pipe is arranged in front of the energy storage pipe on an interface of the oil pipe, the energy release pipe is arranged in front of the oil inlet pipe, and switch valves are arranged on the oil inlet pipe, the oil outlet pipe, the energy storage pipe, the energy release pipe and on the oil circuit connected with the branch oil circuit.

The oil circuit circulation method of the two-way double-screw pumps connected in series is as follows:

1. In a normal working state of the two-way double-screw pumps, when the vehicle is running normally, the oil circuit connected between the two-way double-screw pump motor and the motor is filled with oil, the hydraulic oil circulates on the serial oil circuits among the motors, the switch valves on the oil inlet pipe, the oil outlet pipe, the energy storage pipe and the energy release pipe are closed, and the switch valve on the oil circuit connected with the branch oil circuit is opened;

when the vehicle is braked, the motor is de-energized, the switch valves on the oil outlet pipe of the oil storage tank and on the energy storage pipe of the energy storage tank are opened, the switch valve on the oil circuit connected with the branch oil circuit is closed, the inertia of the vehicle drives the motor to work as an oil pump, the output high pressure oil enters an energy accumulator for storing energy, and the lacking hydraulic oil in the oil pipe is replenished by the oil storage tank;

when the vehicle is started, as large power is required, at this time, the switch valves on the oil outlet pipe and the energy release pipe can be opened, the energy stored in the energy storage tank is released, the motor works as a motor to provide starting power to reduce the power consumption of the motor, if the stored energy is used up, it is driven by the motor, and redundant hydraulic oil in the oil circuit enters the oil storage tank; and 2. when a part of two-way double-screw pumps is subjected to failure and outage, the hydraulic oil circulating among the remaining motors drives the screws of the motor to rotate to realize energy replenishment.

The front drive, the rear drive or the four-wheel drive includes the two-way double-screw pump motors, a high pressure oil collector, an energy accumulator and the oil storage tank, each motor is provided with a self-circulating oil circuit, the output end of each motor is connected with the energy storage pipe through the high pressure oil collector, the input end of each motor is connected with the high pressure oil collector through the energy release pipe, the output end of each motor is connected with the oil storage tank through the oil outlet pipe, the input end of each motor is connected with the oil storage tank through the oil inlet pipe, the high pressure oil collector is connected with the energy storage tank, switch valves are arranged on the oil inlet pipe, the oil outlet pipe, the energy storage pipe, the energy release pipe, the self-circulating oil circuits of the motors and a high pressure oil collection pipe, and the high pressure oil collector is a cavity.

The circulation method among the oil circuits is as follows:

1. In the normal working state of the two-way double-screw pumps, the motors and the connected oil pipes are filled with oil;

when the vehicle is running normally, the switch valves on the self-circulating oil circuits of the motors are opened, the remaining switch valves are closed, and the motors run normally through the respective self-circulating oil circuits;

when the vehicle is braked during walking, the motors are de-energized, and the switch valves on the oil inlet pipes connected to the motors of the oil storage tank are opened, the switch valves on the energy storage pipes of the motors connected with the high pressure oil collector are opened, the switch valve on the oil circuit of the high pressure oil collector connected with the energy storage tank is opened, and the switch valves on the remaining connection circuits are closed; at this time, the vehicle continues to walk under the effect of inertia, so that the motor works as the oil pump, the output high pressure oil enters the energy storage tank through the high pressure oil collector, and the lacking oil in the oil pipes is replenished from the oil tank;

when the vehicle is started, as large power is required, the energy storage tank communicates with the high pressure oil collector, the switch valves on the energy release pipes of the high pressure oil collector connected with the motors are opened, the switch valves on the oil outlet pipes of the motors connected with the oil storage tank are opened, the energy in the energy storage tank is released, and the motor works as a motor to provide starting power to reduce the power consumption of the motor, if the stored energy is used up, the motors are singly driven circularly, and the redundant hydraulic oil in the oil circuit enters the oil storage tank; and 2. when a part of two-way double-screw pumps is subjected to failure and outage, the switch valves on the energy storage tubes of the remaining motors connected with the high pressure oil collector are opened, and the switch valves on the oil inlet pipe connected with the oil storage tank is opened, the switch valve on the energy release pipe of the high pressure oil collector connected with the faulty motor is opened, the oil outlet pipe of the faulty motor communicates with the oil storage tank, if the pressure in the high pressure oil collector is lower than the pressure required by the faulty motor, the high pressure oil collector communicates with the energy storage tank, the energy storage tank releases pressure for energy replenishment, if the pressure in the high pressure oil collector is higher than the pressure required by the faulty motor, the high pressure oil collector communicates with the energy storage tank, and the storage tank stores energy.

The present invention has the beneficial effects that: as the magnetic pole is a superimposed magnetic fields, the power density of the motor is increased; in addition, the number of the stator tooth poles is twice as large as that of the rotor tooth poles, so that the performance is doubled, the angle of the circular arc surface of the tool pole is close to 90°, in this way, the torque ripple is reduced, with the increase of the number of layers, the included angle between the center lines of the tooth poles between two adjacent layers is smaller, and the number of layers for applying the magnetic torque is increased, due to the increase of the number of layers, the number of layers for applying the magnetic torque is increased, when the increased number of layers is completely used for applying the magnetic torque, the torque ripple is only generated within the range of the included angle between the center lines of the tooth poles between two adjacent layers, when the number of layers is large and the included angle is small, the torque ripple is greatly reduced, and as the torque ripple is greatly reduced, the noise and vibration are greatly reduced. The two-way double-screw pump motor of the present invention works as a motor while acting as a pump, thereby not only solving the problem that the structure in which a hydraulic motor is mixed with a motor is not available in the prior art, and meanwhile, the present invention has the advantages of simple structure and easy manufacture.

BRIEF DESCRIPTION OF THE DRAWINGS

FIG. 3-1 is a schematic diagram of a combined structure of a four-outer-spiral outer stator member linear arrangement switched reluctance motor.

FIG. 3-2 is a schematic diagram of a transparent end part of a circular arc surface of an outer spiral stator tooth pole iron core I0231 in FIG. 1.

DETAILED DESCRIPTION OF THE EMBODIMENTS

Figure 1:
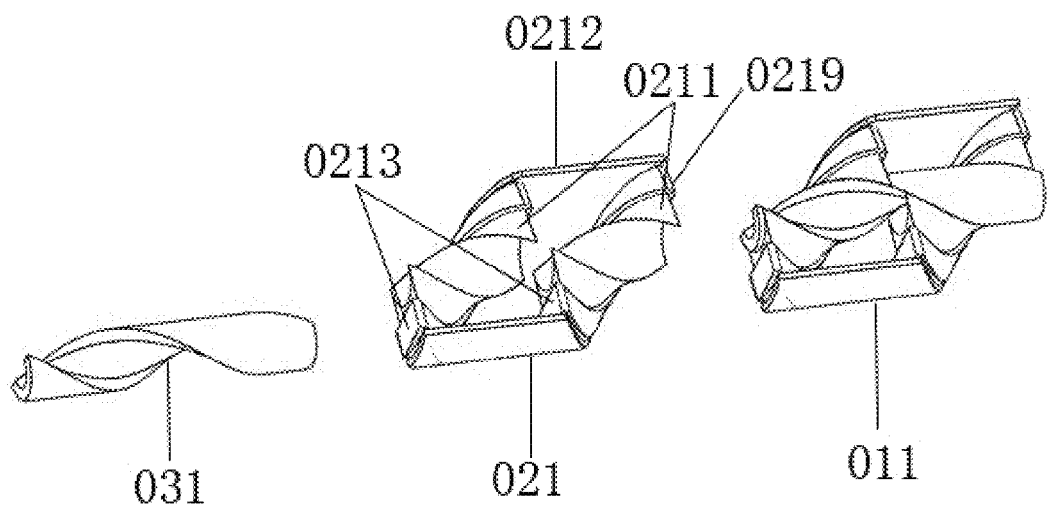
FIG. 1 is a schematic diagram of a combined structure of an outer single-spiral tooth pole linear arrangement switched reluctance motor.
Figures 1, 3:
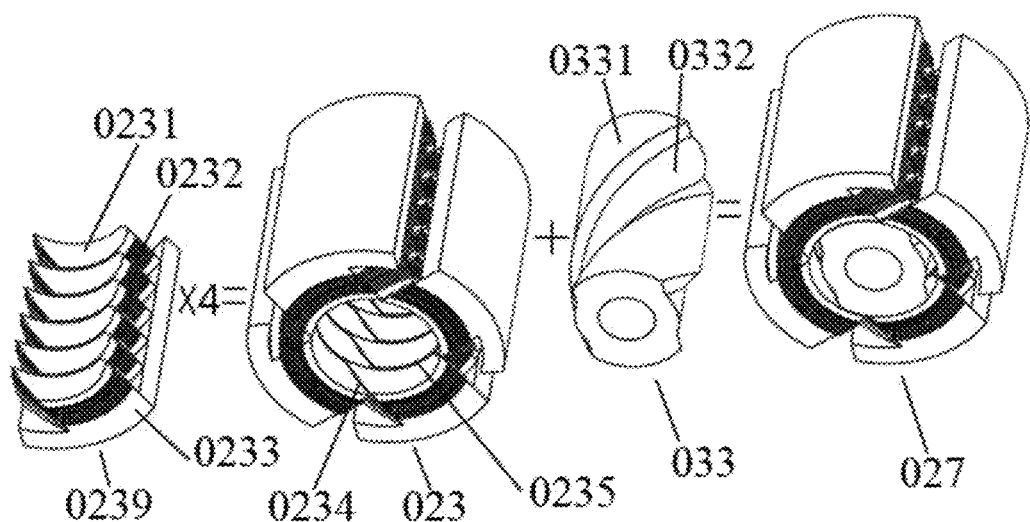
Figures 2, 3:
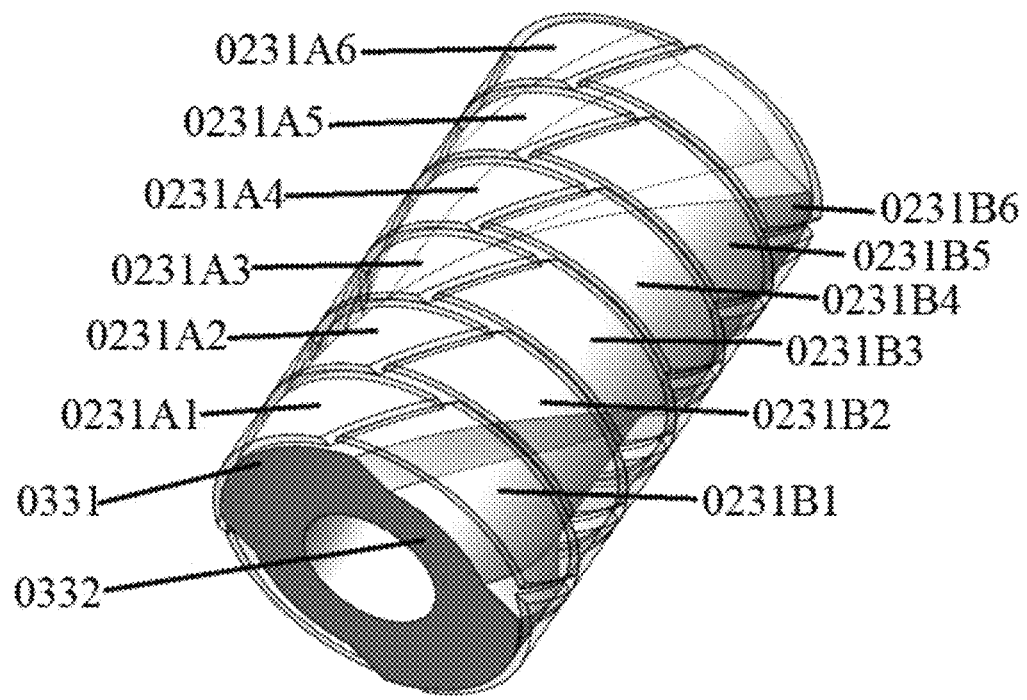

FIG. 3-1 shows a four-outer-spiral outer stator member linear arrangement switched reluctance motor, including an outer spiral stator tooth pole iron core I0231, an outer spiral coil 0232 is sleeved at the outside of the outer spiral stator tooth pole iron core I0231 to form an outer spiral stator tooth pole, 6 outer spiral stator tooth poles are linearly stacked and fixedly arranged to form outer spiral stator tooth pole linear arrangement stator members 0239, four outer spiral stator tooth pole linear arrangement stator members 0239 are evenly arranged along the circumference to form a four-outer-spiral outer stator 272, the number of tooth poles of each layers of four-outer-spiral outer stators is 4, an interval 2734 for avoiding a magnetic short circuit is formed at the end parts of the circular arc surfaces of the adjacent outer spiral stator tooth pole iron cores I0231 along the circumferential direction, and an interval 2735 for avoiding the magnetic short circuit is formed along the direction of a rotation axis, a rotor tooth pole 273 is sleeved in the four-outer-spiral outer stator 272, the rotor tooth pole 273 is spirally arranged by spiral rotor units to form an overall double-spiral rotor 0331, and the overall double-spiral rotor 0331 is supported by a supporting member 0332.

The screw pitch of the spiral iron core 0231 is 660 mm, the length is 50 mm, the thickness of the spiral coil 0232 is 2.5 mm, the length of a single spiral tooth pole is 55 mm, 6 single spiral tooth poles are linearly arranged along the direction of the rotation axis for a length of 330 mm, the yokes thereof are connected by a yoke 0233, the yoke 0223 and the 6 spiral iron cores 0231 are of an integrally formed structure or an overall silicon steel sheet is circumferentially stacked, and the rotor tooth pole is of a double-spiral structure formed by circular rings having circular arc angles of 45 degrees, arranged along the circumference oppositely, matched with the stator iron core and spiraled along the axial direction. The screw pitch is 660 mm, the length is 330 mm, the rotor tooth pole includes structure arrangement using 6 spiral tooth pole units as the spiral, and the rotor tooth pole is arranged in a four-outer-spiral outer stator. The circular arc angle is: $\beta=89°<360/m/2=360/4=90°$, this is because the interval 2734 of the magnetic short circuit is prevented from being formed between the adjacent spiral iron cores 0231 along the circumferential direction, the angle of the circular arc formed by the interval 2734 corresponding to the center of the circle is 2°, as the thickness of the spiral coil 0232 is 2.5 mm, the length of the interval 2735 for avoiding the magnetic short circuit between the adjacent spiral iron cores 0231 along the direction of the rotation axis is 5 mm, and the intervals for avoiding the magnetic short circuit are arranged between the surroundings of all stator iron cores.

Figure 2:
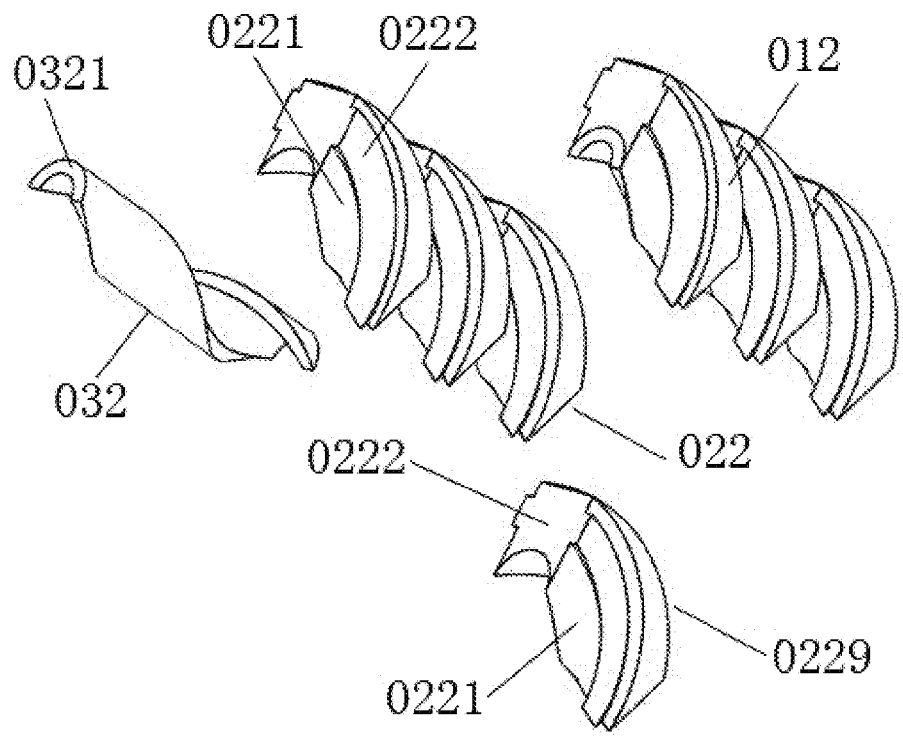
FIG. 2 is a schematic diagram of a combined structure of an outer single-spiral tooth pole linear arrangement switched reluctance motor.

FIG. 3-2 shows a schematic diagram of a transparent end part of a circular arc surface of an outer spiral stator tooth pole iron core I0231 after the most four-outer-spiral outer stators are cut, the four outer-spiral stator tooth pole linear arrangement stator members 0239 are respectively called columns A, B, C, and D respectively; and as shown in FIG. 3-2, the included angle between the center line of the stator tooth pole of the first layer column A and the center line of a corresponding rotor tooth pole unit is 8°, at this time, six outer-spiral stator tooth poles, namely, 0231A1, 0231A2, 0231A3, 0231B4, 0231B5 and 0231B6, generate a magnetic field, so that a tooth pole of an overall double-spiral rotor 0331 is stressed to drive the overall double-spiral rotor 0331 to rotate along a counterclockwise direction, meanwhile the columns C and D generate the same force to drive the overall double-spiral rotor 0331 to rotate along the counterclockwise direction.

When the center line of the stator tooth pole of a certain first layer column A is overlapped with the center line of the corresponding rotor tooth pole unit, the 0231A1 and the 0231B4 do not generate the magnetic field, the four outer-spiral stator tooth poles 0231A2, 0231A3, 0231B5 and 0231B6 generate a magnetic field, after the overall double-spiral rotor 0331 turns over the interval 2734, the six outer-spiral stator tooth poles generate the magnetic field.

The included angle between the center lines of the inter-layer tooth poles is 360/2/6=30°. The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 30°, the included angle between the center line of the stator tooth pole of the third layer column A and the center line of the corresponding rotor tooth pole unit is 60°, the included angle between the center line of the stator tooth pole of the fourth layer column A and the center line of the corresponding rotor tooth pole unit is 90°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 30°, the included angle between the center line of the stator tooth pole of the sixth layer column B and the center line of the corresponding rotor tooth pole unit is 60°, the included angle between the center line of the stator tooth pole of the first layer column B and the center line of the corresponding rotor tooth pole unit is 90°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 30°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, and then enters the adjacent stator tooth pole from the adjacent rotor unit by passing through the air gap and then enters a magnetic conduction stator tooth pole through a yoke to form a loop.

If the two upper and lower tooth poles on the same layer point to opposite polarities of the axle end, then the magnetic line of force of the stator tooth pole passes through the air gap to enter an upper rotor tooth pole, enters the lower rotor tooth pole through a supporting plate along the two sides of the direction of the axis, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop from the yoke to the magnetic line of force.

Figure 7:
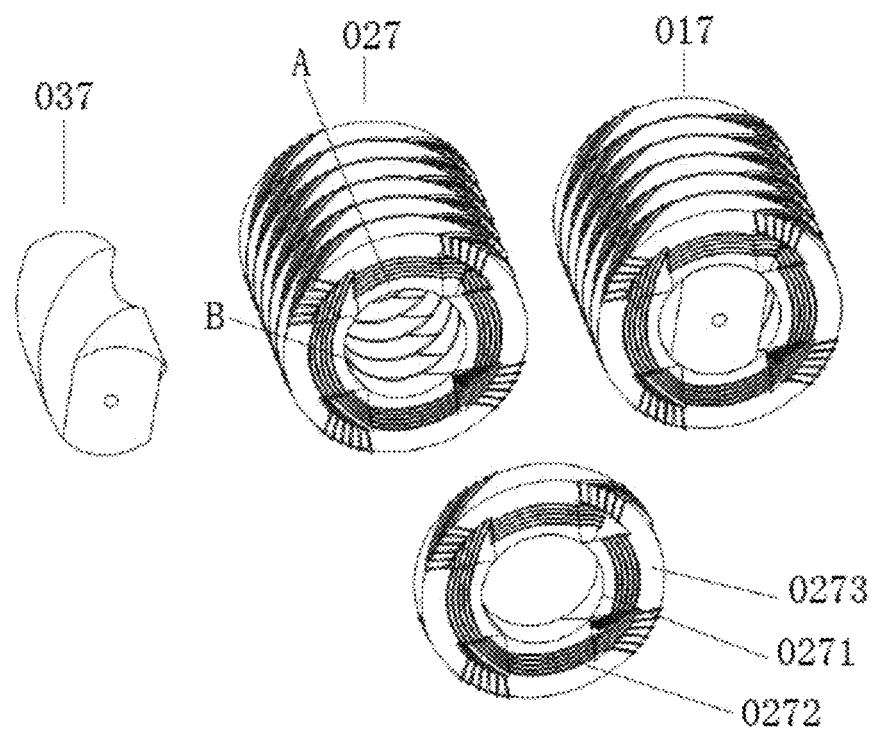
FIG. 7 is a schematic diagram of a combined structure of a four-spiral outer tooth pole stator member linear arrangement motor member.

Of course, the above supporting plate can be deleted, the rotor tooth pole is supported by a non-permeability magnetic material, as the permeability magnetic material has large specific gravity, the present invention not only uses the example, few permeability magnetic materials are used in other examples, so that the weight of the motor can be greatly reduced, the magnetic circuit is automatically generated by leakage flux, if the weight is not considered, the rotor tooth pole can be a solid body as shown in FIG. 7, and the yoke can be a tubular yoke, therefore, the magnetic circuit can be formed according to the principle of minimum magnetic reluctance, then, for the overall motor, the number of the magnetic lines of force entering the rotor tooth pole from the stator tooth pole is approximately equal to the number of the magnetic lines of force entering the stator tooth pole from the rotor tooth pole.

The technical solution of embodiment 3 is a technical solution in which the number of stator tooth poles is equal to the number of the rotor tooth poles, and the number of stator tooth poles and the number of the rotor tooth poles are both 2; the present embodiment is a technical solution in which the number of stator tooth poles is twice as large as the number of the rotor tooth poles, namely, a technical solution in which the number of stator tooth poles is increased from 2 to 4, the number of the rotor tooth poles is unchanged, that is, the technical solution in which the number of stator tooth poles is equal to the number of the rotor tooth poles is redesigned into a technical solution in which the number of stator tooth poles is twice as large as the number of the rotor tooth poles. In the following embodiments 1-2 and 5-29, the technical solution in which the number of stator tooth poles is equal to the number of the rotor tooth poles is adopted, the technical solution in the embodiments 1-2 and 5-29 is redesigned into the technical solution in which the number of stator tooth poles is twice as large as the number of the rotor tooth poles according to the foregoing manner, this is the technical solution of the present invention, and the performance is nearly doubled.

Embodiment 1 as shown in FIG. 1, it shows an outer single-spiral tooth pole linear arrangement switched reluctance motor 011, an outer single-spiral coil 0212 is sleeved at the outside of an outer single-spiral iron core 0211 to form an outer single-spiral stator tooth pole member 0219, two outer single-spiral stator tooth pole members 0219 are linearly arranged along the axial direction to form an outer single-spiral tooth pole linear arrangement stator 201, a rotor tooth pole 031 is sleeved therein, the rotor tooth pole is a semicircular spiral body along the direction of the rotation axis, the screw pitch is the length of two outer single-spiral stator tooth poles.

The screw pitch of the spiral iron core 0211 is 1000 mm, the length is 460 mm, a spiral circular arc surface is formed on the inner side for matching with a rotor to form a magnetic circuit along the direction of the rotation axis, the yoke of the spiral iron core 0211 is a yoke 0213 that is integrally formed with the two spiral iron cores 0211, if the material of the spiral iron core 0211 is a silicon steel sheet, the spiral iron core 0211 integrally formed with the yoke 0213 is a spiral silicon steel sheet integrally formed with the yoke 0213, which is stacked along the circumferential direction to form an overall spiral single tooth pole iron core 0211 and a yoke 0213, which are not shown in the figure, the screw pitch of the rotor tooth pole is 1000 mm, and the length is 1000 mm, which means that two single-spiral tooth pole units with lengths of 500 mm are spirally arranged and are placed in a single-spiral tooth pole linear arrangement stator. Since two layers of single-spiral stator tooth pole linear arrangement stators are arranged, when the center line of the first layer of single-spiral stator tooth pole linear arrangement stator is overlapped with the center line of the corresponding rotor tooth pole unit, the center line of the second layer of single-spiral stator tooth pole linear arrangement stator is basically at a reverse position, in this way, in a rotation process, the rotor continues to rotate due to the rotational inertia, so that the other single-spiral tooth pole generates a magnetic pull force on a single-spiral tooth pole spiral arrangement rotor to drive the rotor to rotate, the action is reciprocated to cause the rotor to continue to rotate, when the rotor stops rotating, a permanent magnet arranged at a position deviating from the stator tooth pole sucks the rotor, so that the center line of the rotor deviates from the center line of the corresponding stator tooth pole, and accordingly the stator tooth pole can drive the rotor tooth pole to rotate when being actuated.

Embodiment 2 as shown in FIG. 2, it shows an outer single-spiral tooth pole linear arrangement switched reluctance motor 012, a spiral coil 0222 is sleeved at the outside of a spiral iron core 0221 to form a stator tooth pole member 0219, the stator tooth pole members 0219 are linearly arranged along the axial direction to form an outer single-spiral tooth pole linear arrangement stator 022, a rotor tooth pole 032 is sleeved therein, and the rotor tooth pole 032 is formed by spirally arranging 3 spiral rotor units 0321. The sum of the length of each layer of single-spiral tooth pole iron core and the thickness of the coil is 333.3 mm, a groove can be formed in the side of the iron core, the coil can be arranged in the groove in the side of the iron core in a surrounding manner, the three layers of single-spiral tooth poles are linearly arranged to form the single-spiral tooth pole linear arrangement stator, and a yoke connection is arranged at the yoke of the stator.

When the center line of the first layer of stator is overlapped with the center line of the rotor unit, the included angle between the center line of the second layer of stator and the center line of the corresponding rotor unit is 120°, so that the second layer generates a magnetic pull force, when the second layer of rotor unit rotates 600, the third layer of rotor unit is just in contact with the third layer of stator tooth pole member, the included angle of the center lines of the two is 180°, at this time, (1) the third layer generates no magnetic pull force, the second layer continues to generate the magnetic pull force and rotates 60°, the center lines of the two is overlapped, the included angle between the center lines of the two components on the third layer is 60°, the circulation is executed in this way, and the rotor can continuously rotate; (2) the third layer generates the magnetic pull force, and the rotor is rotated 60° together with the third layer, and the circulation is executed in this way, so that the torque at 600 is greater than the torque in (1); (3) the third layer generates the magnetic pull force, the second layer stops the magnetic pull force to drive the rotor to rotate 600, the torque at 600 is the minimum, and the circulation is executed in this way to generate three torques with different strength so as to adapt to different demands. Of course, the above manner is also applicable to a structure in which the stator is formed by the spirally arranged single-spiral tooth pole stator members, which is matched with the linear arrangement of the single-spiral tooth pole rotor units. Of course, the above outer stator structure can also be replaced by a structure in which a single-spiral tooth pole inner stator is matched with a single tooth pole unit outer rotor.

The above tooth pole can also be a straight tooth, and at this time, both of the rotor and the stator are straight teeth.

Embodiment 4

Figure 4:
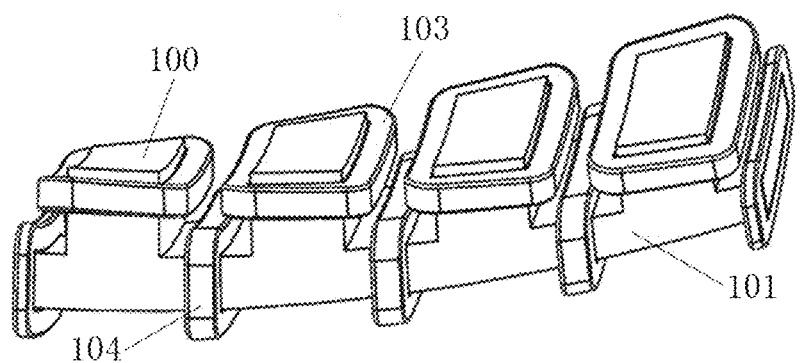
FIG. 4 is a schematic diagram of a combined structure of a spiral strip-shaped stator tooth pole member.

FIG. 4 shows a spiral strip-shaped stator tooth pole member, four layers of spiral tooth poles 100 are spirally arranged on the direction of the rotation axis to form a spiral strip-shaped spiral stator tooth pole, the yoke of the spiral strip-shaped spiral stator tooth pole uses a matched spiral strip-shaped permeability magnetic material as a yoke 101, the yokes of the spiral strip-shaped spiral stator tooth poles formed by the four spiral tooth poles 100 are connected to form a string magnetic U-shaped electromagnet, a tooth pole coil 103 is sleeved at the outside of the spiral tooth poles 100, and a spiral yoke coil 104 is sleeved on a yoke 102 between the spiral tooth poles 100 to form the spiral strip-shaped spiral tooth pole stator member. Such members are uniformly arranged along the circumference to form a spiral strip-shaped spiral tooth pole stator.

Embodiment 5

Figure 5:
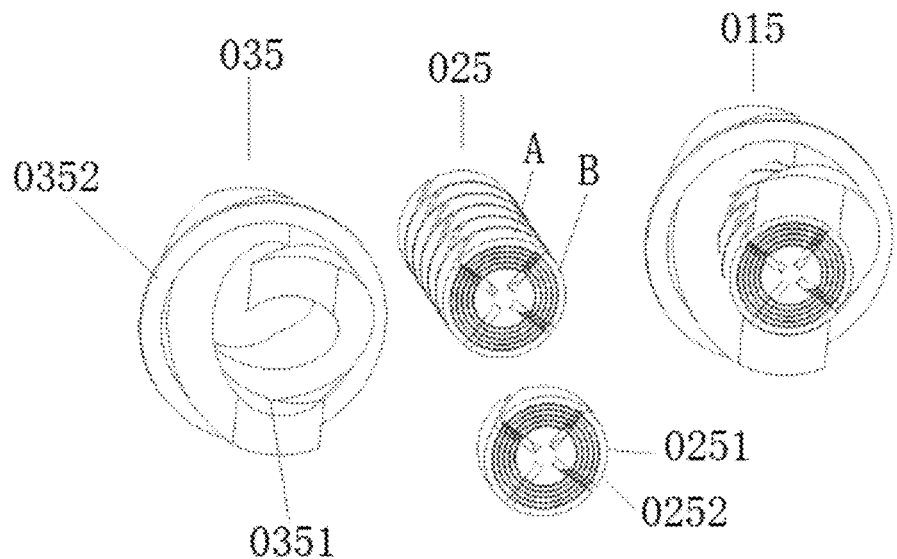
FIG. 5 is a schematic diagram of a combined structure of a sheet four-spiral inner stator tooth pole linear arrangement motor member.

FIG. 5 shows a sheet four-spiral inner stator tooth pole linear arrangement motor 015, a tooth pole coil 0252 is sleeved at the outside of a sheet four-spiral stator tooth pole iron core 0251 to form a sheet four-spiral stator tooth pole member 025, the stator tooth pole members are linearly arranged along the axial direction to form a sheet four-spiral stator tooth pole linear arrangement stator, the central portion of the stator is a yoke, the yokes of 6 sheet four-spiral inner stator tooth pole iron cores can be connected by a permeability magnetic material, but are not connected generally. An overall double-spiral rotor tooth pole I035 matched with the sheet four-spiral stator tooth pole linear arrangement stator is sleeved at the outside of the sheet four-spiral stator tooth pole linear arrangement stator, spiral rotor units are spirally arranged to form a spiral rotor strip 0351, and two spiral rotor strips 0351 are supported by a bracket I0352 to form the double-spiral rotor tooth pole I035.

The sheet inner four-spiral stator tooth pole members 025 are respectively called columns A, B, C, D; the included angle between the center line of the stator tooth pole of the first layer column A and the center line of the corresponding rotor tooth pole unit are θ, θ>0°, at this time, six spiral stator tooth poles, namely, 0251A1, 0251A2, 0251A3, 0251B4, 0251B5 and 0251B6 generate a magnetic field, so that a tooth pole of the overall double-spiral rotor tooth pole I035 is stressed to drive the overall double-spiral rotor tooth pole I035 to rotate along a counterclockwise direction, meanwhile the columns C and D generate the same force to drive the overall double-spiral rotor tooth pole I035 to rotate along the counterclockwise direction.

When the center line of the stator tooth pole of a certain first layer column A is overlapped with the center line of the corresponding rotor tooth pole unit, the 0251A1 and the 0251B4 do not generate the magnetic field, the four spiral stator tooth poles 0251A2, 0251A3, 0251B5 and 0251B6 generate a magnetic field, after the overall double-spiral rotor tooth pole I035 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 30°, the included angle between the center line of the stator tooth pole of the third layer column A and the center line of the corresponding rotor tooth pole unit is 60°, the included angle between the center line of the stator tooth pole of the fourth layer column A and the center line of the corresponding rotor tooth pole unit is 90°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 30°, the included angle between the center line of the stator tooth pole of the sixth layer column B and the center line of the corresponding rotor tooth pole unit is 60°, the included angle between the center line of the stator tooth pole of the first layer column B and the center line of the corresponding rotor tooth pole unit is 90°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 30°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, and then enters the adjacent stator tooth pole from the adjacent rotor unit by passing through the air gap and then enters a magnetic conduction stator tooth pole to form a loop.

If the two upper and lower tooth poles on the same layer point to opposite polarities of the axle end, then the magnetic line of force of the stator tooth pole passes through the air gap to enter an upper rotor tooth pole, enters the lower rotor tooth pole through a magnetic conduction bracket I along the two sides of the direction of the axis, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 6

Figure 6:
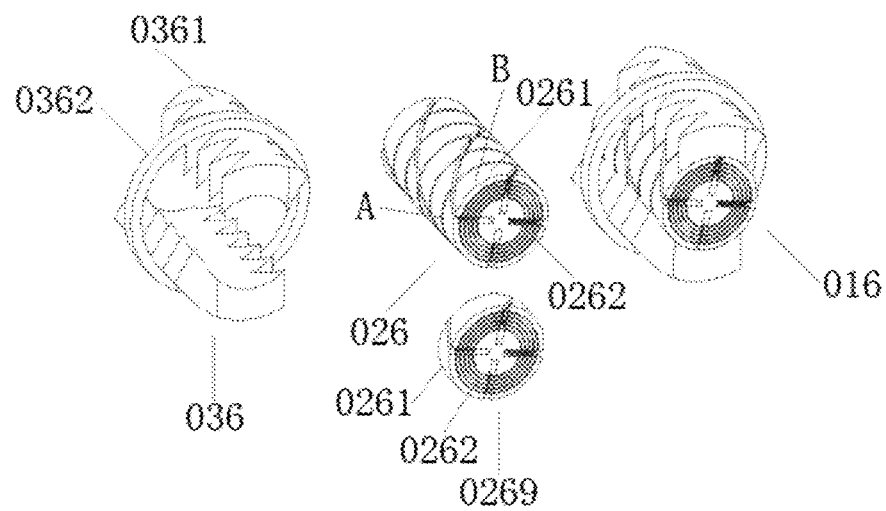
FIG. 6 is a schematic diagram of a combined structure of a sheet four-spiral inner stator tooth pole spiral arrangement motor member.

FIG. 6 shows a sheet four-spiral inner stator tooth pole spiral arrangement motor 016, a tooth pole coil 0262 is sleeved at the outside of a sheet four-spiral stator tooth pole iron core 0261 to form a sheet inner four-spiral stator tooth pole member 0269, the stator tooth pole members 0269 are spirally arranged along the axial direction to form a sheet four-spiral stator tooth pole spiral arrangement stator 026, an overall double-spiral rotor tooth pole II036 matched with the sheet four-spiral stator tooth pole spiral arrangement stator is sleeved at the outside of the sheet four-spiral stator tooth pole spiral arrangement stator, spiral rotor units 0361 are linearly arranged to form an entirety and are supported by a bracket II0362 to form the double-spiral rotor tooth pole II036, and the rest is the same as those in the embodiment as shown in FIG. 5.

The sheet four-spiral stator tooth pole spiral arrangement stators 026 are respectively called columns A, B, C, D; the included angle between the center line of the stator tooth pole of the first layer column A and the center line of the corresponding rotor tooth pole unit are θ, θ>0°, at this time, six spiral stator tooth poles, namely, 0261A1, 0261A2, 0261A3, 0261B4, 0261B5 and 0261B6 generate a magnetic field, so that a tooth pole of the double-spiral rotor tooth pole II036 is stressed to drive the double-spiral rotor tooth pole II036 to rotate along a counterclockwise direction, meanwhile the columns C and D generate the same force to drive the double-spiral rotor tooth pole II036 to rotate along the counterclockwise direction.

When the center line of the stator tooth pole of a certain first layer column A is overlapped with the center line of the corresponding rotor tooth pole unit, the 0261A1 and the 0261B4 do not generate the magnetic field, the four spiral stator tooth poles 0261A2, 0261A3, 0261B5 and 0261B6 generate a magnetic field, after the overall double-spiral rotor tooth pole II036 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 30°, the included angle between the center line of the stator tooth pole of the third layer column A and the center line of the corresponding rotor tooth pole unit is 60°, the included angle between the center line of the stator tooth pole of the fourth layer column A and the center line of the corresponding rotor tooth pole unit is 90°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 30°, the included angle between the center line of the stator tooth pole of the sixth layer column B and the center line of the corresponding rotor tooth pole unit is 60°, the included angle between the center line of the stator tooth pole of the first layer column B and the center line of the corresponding rotor tooth pole unit is 90°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 30°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole to form a loop.

If the two upper and lower tooth poles on the same layer point to opposite polarities of the axle end, then the magnetic line of force of the stator tooth pole passes through the air gap to enter an upper rotor tooth pole, enters the lower rotor tooth pole through a magnetic conduction bracket II along the two sides of the direction of the axis, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Of course, the iron core in the middle of the spiral stator tooth pole member can be connected by a yoke. The tooth pole iron core described in the patent is connected with the yoke. Generally, the tooth pole iron core and the yoke iron are of an integrally formed structure, or silicon steel sheets are arranged along the circumference, and of course, a single tooth pole iron core is attached to the yoke and is fixed together, such as tying, bonding and the like.

Embodiment 7

FIG. 7 shows a four-spiral outer tooth pole stator member linear arrangement motor 017, the stator is composed of four outer-spiral stator tooth pole iron cores 0271, which are oppositely arranged along the circumference, and is connected by an annular yoke I0273, an outer-spiral coil 0272 is sleeved at the outside of the outer-spiral stator tooth pole iron cores 0271, the rotor is of a solid structure, and the other structures are the same as those of the outer-spiral outer stator member linear arrangement switch reluctance motor, as shown in FIG. 3-1 and FIG. 3-2.

Embodiment 8

Figure 8:
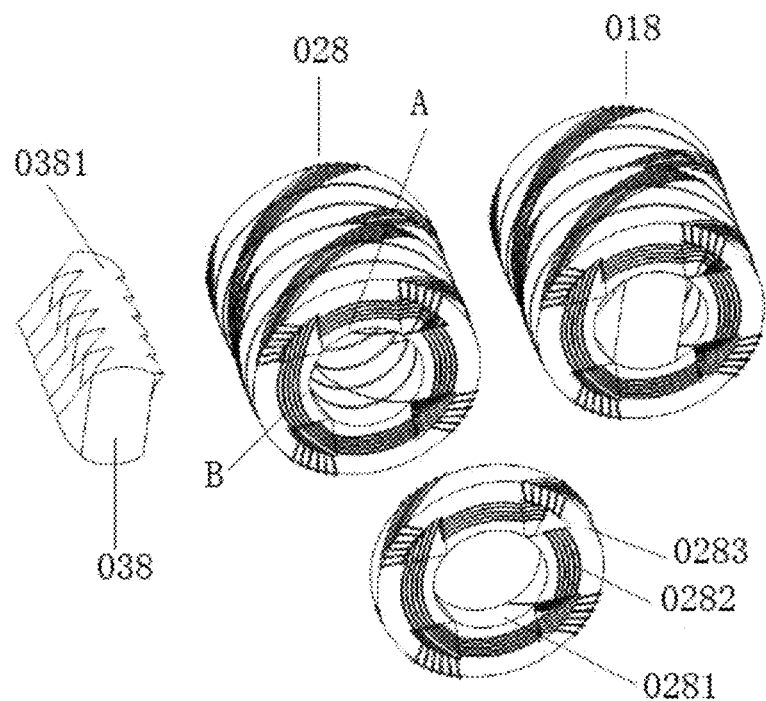
FIG. 8 is a schematic diagram of a combined structure of a four-outer-spiral outer tooth pole spiral arrangement motor member.

FIG. 8 shows a four-outer-spiral outer tooth pole spiral arrangement motor 018, the stator is composed of four outer-spiral stator tooth pole iron cores II0281, which are oppositely arranged along the circumference, and is connected by an annular yoke II0283, an outer-spiral coil 0282 is sleeved at the outside of the four outer-spiral stator tooth pole iron cores II0281, the 6 members are spirally arranged along the direction of rotation axis to form a four-outer-spiral outer tooth pole spiral arrangement stator 028, a rotor tooth pole I038 is sleeved therein, and straight-tooth rotor units 0381 are linearly arranged on the rotor tooth pole I038 to form an overall linear rotor.

The four-spiral outer tooth pole spiral arrangement stators 028 are respectively called columns A, B, C, D; the included angle between the center line of the stator tooth pole of the first layer column A and the center line of the corresponding rotor tooth pole unit are θ, θ>0°, at this time, six spiral stator tooth poles, namely, 0281A1, 0281A2, 0281A3, 0281B4, 0281B5 and 0281B6 generate a magnetic field, so that a tooth pole of the overall rotor tooth pole I038 is stressed to drive the overall rotor tooth pole I038 to rotate along a counterclockwise direction, meanwhile the columns C and D generate the same force to drive the overall rotor tooth pole I038 to rotate along the counterclockwise direction.

When the center line of the stator tooth pole of a certain first layer column A is overlapped with the center line of the corresponding rotor tooth pole unit, the 0281A1 and the 0281B4 do not generate the magnetic field, the four spiral stator tooth poles 0281A2, 0281A3, 0281B5 and 0281B6 generate a magnetic field, after the overall rotor tooth pole I038 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 30°, the included angle between the center line of the stator tooth pole of the third layer column A and the center line of the corresponding rotor tooth pole unit is 60°, the included angle between the center line of the stator tooth pole of the fourth layer column A and the center line of the corresponding rotor tooth pole unit is 90°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 30°, the included angle between the center line of the stator tooth pole of the sixth layer column B and the center line of the corresponding rotor tooth pole unit is 60°, the included angle between the center line of the stator tooth pole of the first layer column B and the center line of the corresponding rotor tooth pole unit is 90°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 30°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole to form a loop.

If the two upper and lower tooth poles on the same layer point to opposite polarities of the axle end, then the magnetic line of force of the stator tooth pole passes through the air gap to enter an upper rotor tooth pole, enters the lower rotor tooth pole by passing through a rotor solid along the radial direction, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Figure 9:
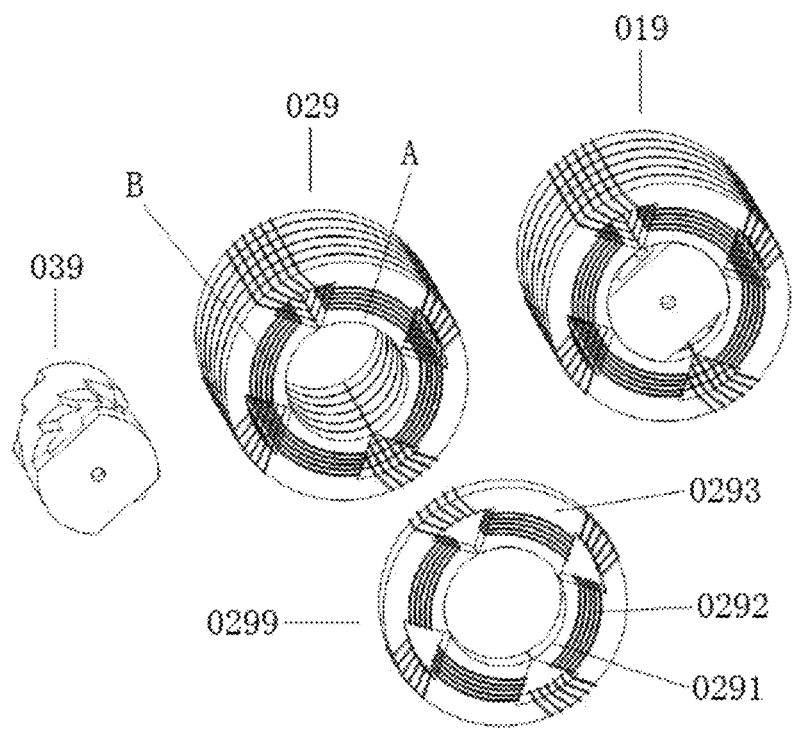
FIG. 9 is a schematic diagram of a combined structure of a four-straight-tooth outer tooth pole linear arrangement motor member.

Embodiment 9 as shown in FIG. 9, four-straight-tooth outer stator tooth pole iron cores 0291 oppositely arranged along the circumference are connected by an annular yoke III0293, a coil 0292 is sleeved at the outside of the four-straight-tooth outer stator tooth pole iron cores 0291 to form a four-straight-tooth outer stator linear arrangement stator member 0299, the members are linearly arranged along the axial direction to form a four-straight-tooth outer linear arrangement stator member 029, a rotor tooth pole is a double-straight-tooth inner rotor tooth pole unit formed by straight teeth formed by 45-degree circular arcs on inner and outer edges, 6 double-straight-tooth inner rotor tooth pole units are spirally arranged along the axial direction to form an overall double-straight-tooth inner rotor tooth pole unit spiral arrangement rotor 039, the screw pitch of the double-straight-tooth inner rotor tooth pole unit spiral arrangement rotor 039 is 660 mm, the length is 330 mm, a four-outer-straight-tooth stator tooth pole linear arrangement stator is sleeved at the outside of the double-straight-tooth inner rotor tooth pole unit spiral arrangement rotor to form a four-straight-tooth outer tooth pole linear arrangement motor 019, and the rest of the present embodiment is the same as those of the embodiment as shown in FIG. 7 except the straight teeth.

Embodiment 10

Figure 10:
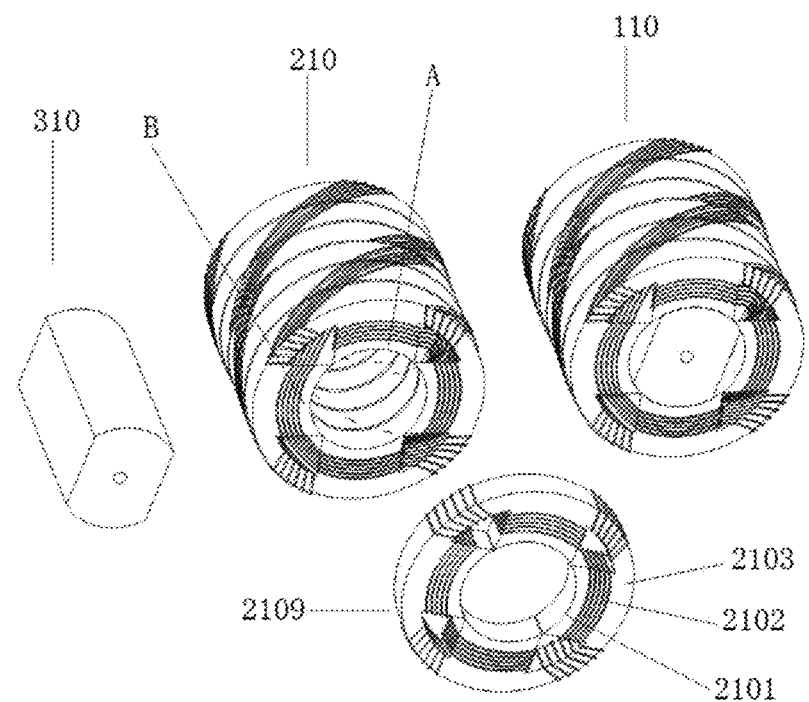
FIG. 10 is a schematic diagram of a combined structure of a four-straight-tooth outer spiral arrangement stator switched reluctance motor member.

FIG. 10 shows a four-straight-tooth outer spiral arrangement stator switched reluctance motor, and as shown in FIG. 10, only the tooth poles of the rotor and the stator are straight teeth, and the rest is the same as FIG. 8.

Embodiment 11

Figure 11:
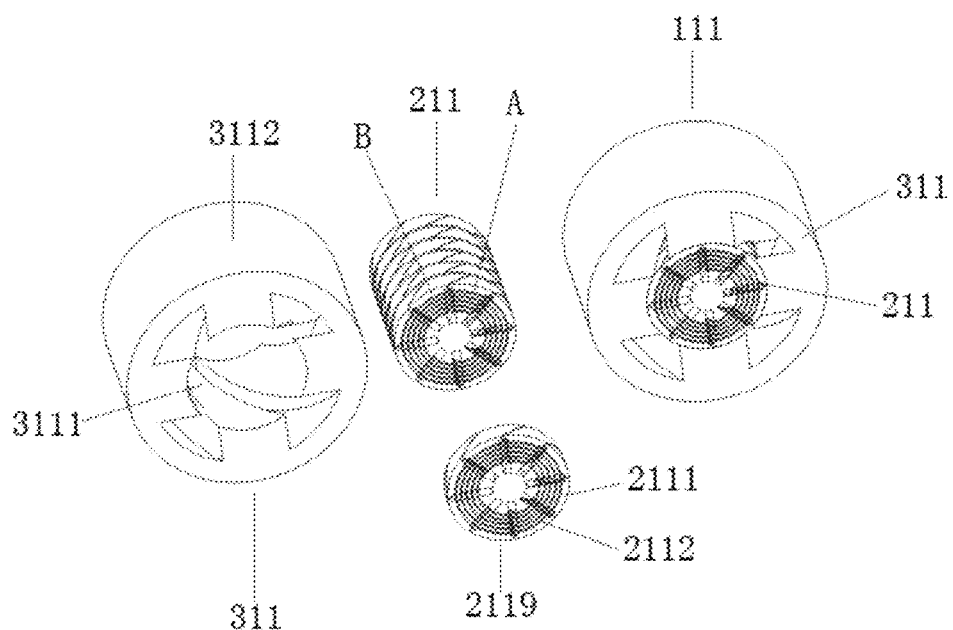
FIG. 11 is a schematic diagram of a combined structure of an eight-spiral inner stator tooth pole linear arrangement switched reluctance motor member.

FIG. 11 shows an eight-spiral inner stator tooth pole linear arrangement motor 111, a tooth pole coil 2112 is sleeved at the outside of an eight-spiral inner stator tooth pole iron core 2111 to form an eight-spiral stator tooth pole member 2119, 6 eight-spiral stator tooth pole members 2119 are linearly arranged along the axial direction to form an eight-inner-spiral inner stator tooth pole linear arrangement stator 211, a spiral rotor tooth pole 311 is sleeved at the outside of the eight-inner-spiral inner stator tooth pole linear arrangement stator, and a spiral outer rotor tooth pole strip I3111 is fixed by a cylindrical bracket 3112 to form an entirety.

The screw pitch of the eight-spiral inner stator tooth pole iron core 2111 is 816 m, the width is 30 mm, the thickness of the tooth pole coil 2112 is 2 mm, the screw pitch of the spiral outer rotor tooth pole strip I3111 is 816 mm, the length is 204 mm, and the included angle between the center lines of the two layers of spiral outer rotor tooth pole units is 15°.

The eight-inner-spiral stator tooth pole linear arrangement stators 211 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2111A1, 2111A2, 2111A3, 2111B4, 2111B5 and 2111B6 generate a magnetic field, so that a tooth pole of the overall rotor tooth pole 311 is stressed to drive the overall spiral rotor tooth pole 311 to rotate along a counterclockwise direction, meanwhile the columns C, D, E, F, G, H generate the same force to drive the overall rotor tooth pole 311 to rotate along the counterclockwise direction.

When the center line of the stator tooth pole of a certain first layer column A is overlapped with the center line of the corresponding rotor tooth pole unit, the 2111A1 and 2111B4 do not generate the magnetic field, the four spiral stator tooth poles 2111A2, 2111A3, 2111B5 and 2111B6 generate a magnetic field, after the overall rotor tooth pole 311 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole through a magnetic conduction bracket along the two sides of the direction of the axis, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 12 the stator in the embodiment 12 is an inner-eight tooth pole stator, which is unlikely to be made into an annular yoke and is made into a solid yoke to the best, and thus, it is the same as the embodiment 11.

Embodiment 13 the stator in the embodiment 13 is an inner-eight tooth pole stator, which is unlikely to be made into an annular yoke and is made into a solid yoke to the best, and thus, it is the same as the embodiment 14.

Embodiment 14

Figure 12:
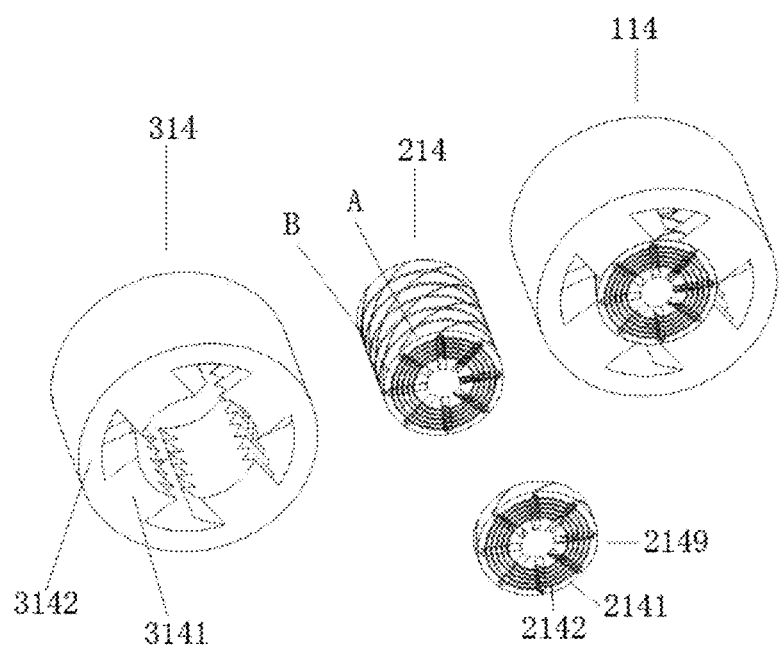
FIG. 12 is a schematic diagram of a combined structure of an eight-spiral inner stator tooth pole spiral arrangement switched reluctance motor member.

FIG. 12 shows an eight-spiral inner stator tooth pole spiral arrangement motor 114, a tooth pole coil 2142 is sleeved at the outside of an eight-spiral stator tooth pole iron core 2141 to form an eight-spiral stator tooth pole member, 6 eight-spiral stator tooth pole members are spirally arranged along the axial direction to form an eight-inner-spiral stator tooth pole spiral arrangement stator 214, a linear rotor tooth pole 314 is sleeved at the outside of the eight-inner-spiral stator tooth pole spiral arrangement stator, and a spiral outer rotor tooth pole strip II3141 is fixed by a cylindrical bracket V3142 to form an entirety.

The eight-inner-spiral stator tooth pole spiral arrangement stators 214 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2141A1, 2141A2, 2141A3, 2141B4, 2141B5 and 2141B6 generate a magnetic field, so that a tooth pole of the overall linear rotor tooth pole 314 is stressed to drive the overall linear rotor tooth pole 314 to rotate along a counterclockwise direction, meanwhile the columns C, D, E, F, G, H generate the same force to drive the overall linear rotor tooth pole 314 to rotate along the counterclockwise direction.

When the center line of the stator tooth pole of a certain first layer column A is overlapped with the center line of the corresponding rotor tooth pole unit, the 2141A1 and 2141B4 do not generate the magnetic field, the four spiral stator tooth poles 2141A2, 2141A3, 2141B5 and 2141B6 generate a magnetic field, after the overall linear rotor tooth pole 314 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole through a magnetic conduction bracket V along the two sides of the direction of the axis, passes through the air gap between the lower rotor tooth pole and a stator tooth pole and enters a lower stator tooth pole iron core to generate a torque. When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 15

Figure 13:
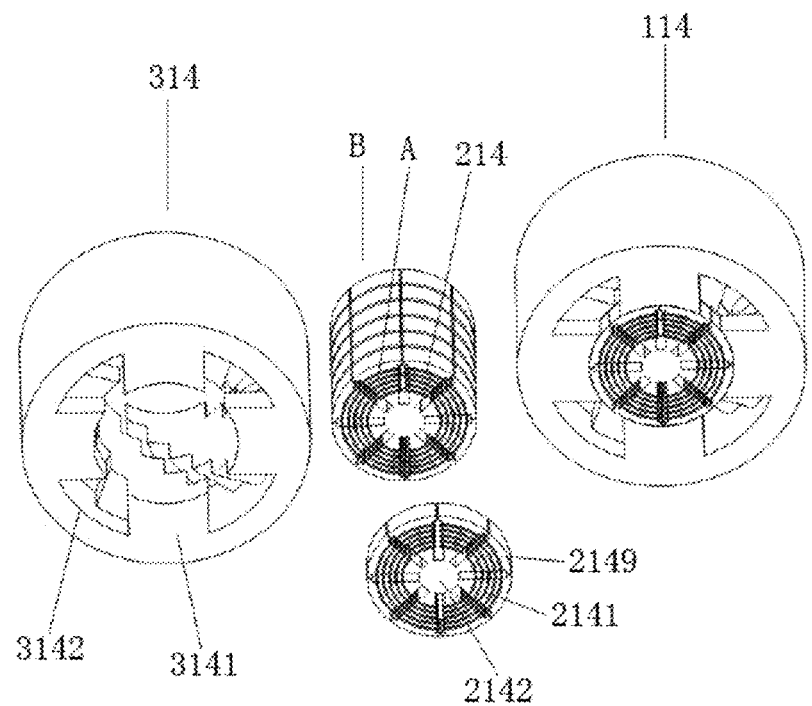
FIG. 13 is a schematic diagram of a combined structure of an inner eight-spiral ring stator tooth pole linear arrangement switched reluctance motor member.

FIG. 13 shows an inner eight-spiral ring stator tooth pole linear arrangement motor 115, the stator is composed of 8 straight-tooth stator tooth pole iron cores I2151 uniformly arranged along the circumference and is connected by a solid yoke 2153, a tooth pole coil 2152 is sleeved at the outside of the straight-tooth stator tooth pole iron cores I2151 to form an inner eight-spiral ring stator tooth pole member 2159, the members are linearly arranged along the direction of the rotation axis to form an inner eight-spiral ring stator tooth pole linear arrangement stator 215, an outer spiral rotor tooth pole 315 is sleeved at the outside of the inner eight-spiral ring stator tooth pole linear arrangement stator, and a straight-tooth tooth pole strip 3151 is fixed by a bracket VI3152 to form an outer spiral rotor tooth pole 315.

The inner eight-spiral ring stator tooth pole linear arrangement stators 215 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2151A1, 2151A2, 2151A3, 2151B4, 2151B5 and 2151B6 generate a magnetic field, so that a tooth pole of the overall outer spiral rotor tooth pole 315 is stressed to drive the overall outer spiral rotor tooth pole 315 to rotate along a counterclockwise direction, meanwhile the columns C, D, E, F, G, H generate the same force to drive the overall outer spiral rotor tooth pole 315 to rotate along the counterclockwise direction.

When the center line of the stator tooth pole of a certain first layer column A is overlapped with the center line of the corresponding rotor tooth pole unit, the 2151A1 and 2151B4 do not generate the magnetic field, the four spiral stator tooth poles 2151A2, 2151A3, 2151B5 and 2151B6 generate a magnetic field, after the overall outer spiral rotor tooth pole 315 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole through a magnetic conduction bracket VI along the two sides of the direction of the axis, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 16 the stator in the embodiment 16 is an inner-eight tooth pole stator, which is unlikely to be made into an annular yoke and is made into a solid yoke to the best, and thus, it is the same as the embodiment 17.

Embodiment 17

Figure 14:
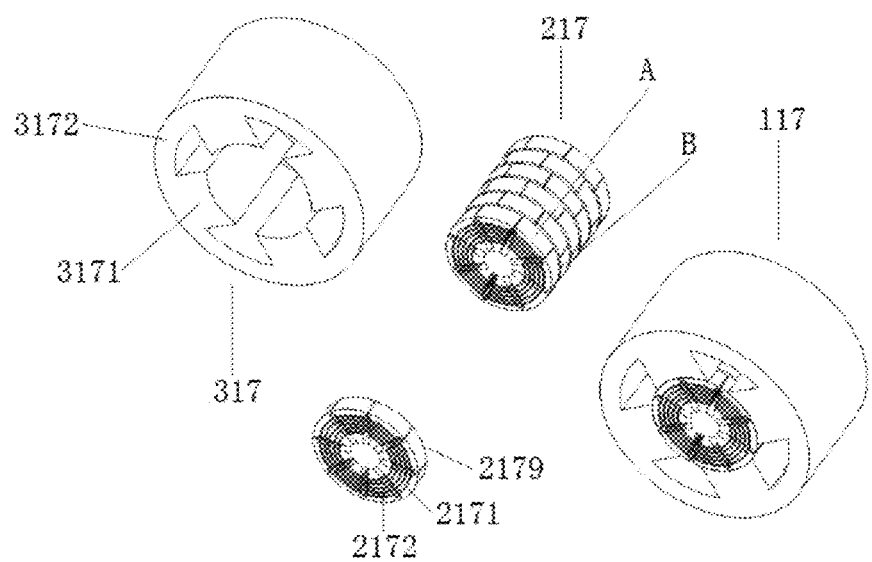
FIG. 14 is a schematic diagram of a combined structure of an eight-spiral inner stator tooth pole spiral arrangement switched reluctance motor member.

FIG. 14 shows an eight-spiral inner stator tooth pole spiral arrangement motor 117, a tooth pole coil 2172 is sleeved at the outside of an eight-spiral stator tooth pole iron core 2171 to form an eight-spiral stator tooth pole member, 6 eight-spiral stator tooth pole members are spirally arranged along the axial direction to form an eight-inner-spiral stator tooth pole spiral arrangement stator 217, a linear rotor tooth pole 317 is sleeved at the outside of the eight-inner-spiral stator tooth pole spiral arrangement stator, and a straight-tooth outer rotor tooth pole strip 3171 is fixed by a bracket IX3172 to form an entirety.

The screw pitch of the eight-spiral stator tooth pole iron core 2171 is 816 mm, the width is 30 mm, the thickness of the tooth pole coil 2172 is 2 mm, and the length of the straight-tooth outer rotor tooth pole strip 3171 is 204 mm.

The eight-inner-spiral stator tooth pole spiral arrangement stators 217 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2171A1, 2171A2, 2171A3, 2171B4, 2171B5 and 2171B6 generate a magnetic field, so that a tooth pole of the overall linear rotor tooth pole 317 is stressed to drive the overall linear rotor tooth pole 317 to rotate along a counterclockwise direction, meanwhile the columns C, D, E, F, G, H generate the same force to drive the overall linear rotor tooth pole 317 to rotate along the counterclockwise direction.

When the center line of the stator tooth pole of a certain first layer column A is overlapped with the center line of the corresponding rotor tooth pole unit, the 2171A1 and 2171B4 do not generate the magnetic field, the four spiral stator tooth poles 2171A2, 2171A3, 2171B5 and 2171B6 generate a magnetic field, after the overall linear rotor tooth pole 317 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole through a magnetic conduction bracket IX along the two sides of the direction of the axis, passes through the air gap between the lower rotor tooth pole and a stator tooth pole and enters a lower stator tooth pole iron core to generate a torque. When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 18

Figure 15:
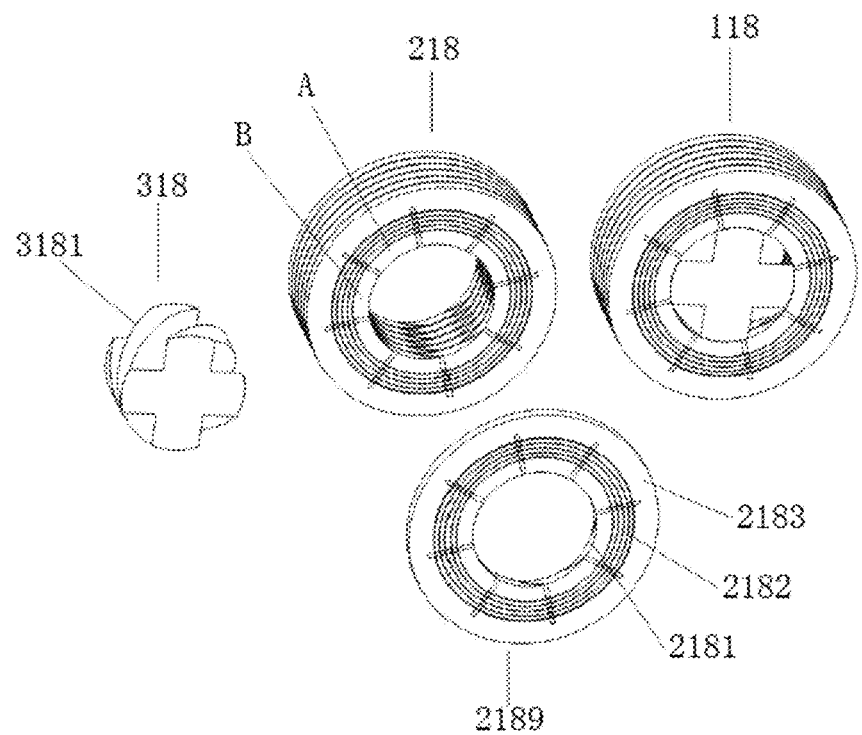
FIG. 15 is a schematic diagram of a combined structure of an eight-spiral outer stator tooth pole linear arrangement switched reluctance motor member.

FIG. 15 shows an outer eight-spiral outer stator tooth pole linear arrangement motor 118, the stator is composed of 8 spiral stator tooth pole iron cores III2181 uniformly arranged along the circumference and is connected by an annular yoke VII2183, a tooth pole coil 2182 is sleeved at the outside of the spiral stator tooth pole iron cores III2181 to form a stator tooth pole member 2189, 6 members are linearly arranged along the axial direction to form a spiral outer stator tooth pole linear arrangement stator 218, a rotor tooth pole III318 is sleeved in the spiral outer stator tooth pole linear arrangement stator, and cross four-spiral tooth pole units 3181 of the rotor tooth pole III318 are spirally arranged to form an overall four-spiral rotor.

The spiral outer stator tooth pole linear arrangement stators 218 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2181A1, 2181A2, 2181A3, 2181B4, 2181B5 and 2181B6 generate a magnetic field, so that a tooth pole of the overall rotor tooth pole III318 is stressed to drive the overall rotor tooth pole 111318 to rotate along a counterclockwise direction, meanwhile the columns C, D, E, F, G, H generate the same force to drive the overall rotor tooth pole III318 to rotate along the counterclockwise direction.

When the center line of the stator tooth pole of a certain first layer column A is overlapped with the center line of the corresponding rotor tooth pole unit, the 2181A1 and 2181B4 do not generate the magnetic field, the four spiral stator tooth poles 2181A2, 2181A3, 2181B5 and 2181B6 generate a magnetic field, after the overall rotor tooth pole III318 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole through a yoke to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole by passing through a rotor along the radial direction, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 19

Figure 16:
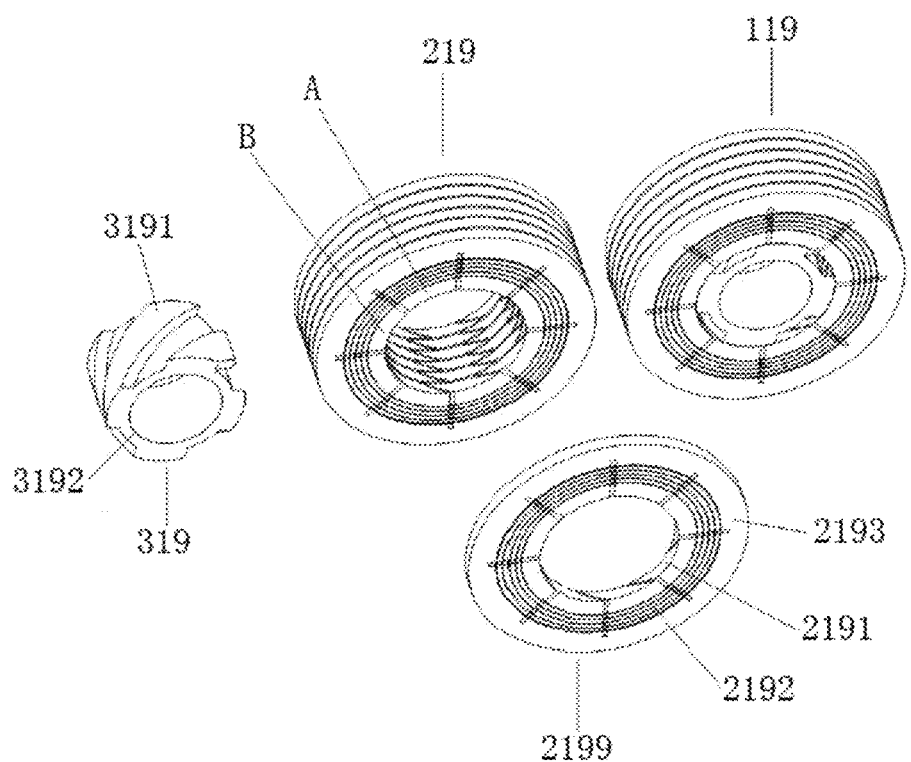
FIG. 16 is a schematic diagram of a combined structure of an eight-spiral outer stator tooth pole linear arrangement switched reluctance motor member.

FIG. 16 shows an eight-spiral outer stator tooth pole linear arrangement motor 119, the stator is composed of 8 spiral stator tooth pole iron cores IV2191 uniformly arranged along the circumference and is connected by an annular yoke IX2193, a tooth pole coil 2192 is sleeved at the outside of the spiral stator tooth pole iron cores IV2191 to form a stator tooth pole member 2199, 6 members are linearly arranged along the axial direction to form a spiral outer stator tooth pole linear arrangement stator 219, a rotor tooth pole IV319 is sleeved in the spiral outer stator tooth pole linear arrangement stator, spiral tooth pole units 3191 of the rotor tooth pole IV319 are spirally arranged to form an overall four-spiral rotor, and the spiral tooth pole units 3191 are connected by an annular rotor yoke 3192.

The spiral outer stator tooth pole linear arrangement stators 219 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2191A1, 2191A2, 2191A3, 2191B4, 2191B5 and 2191B6 generate a magnetic field, so that a tooth pole of the overall rotor tooth pole IV319 is stressed to drive the overall rotor tooth pole IV319 to rotate along a counterclockwise direction, meanwhile the columns C, D, E, F, G, H generate the same force to drive the overall rotor tooth pole IV319 to rotate along the counterclockwise direction.

When the center line of the stator tooth pole of a certain first layer column A is overlapped with the center line of the corresponding rotor tooth pole unit, the 2191A1 and 2191B4 do not generate the magnetic field, the four spiral stator tooth poles 2191A2, 2191A3, 2191B5 and 2191B6 generate a magnetic field, after the overall rotor tooth pole IV319 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole through a yoke to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole through an annular rotor yoke along the two sides of the direction of the axis, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 20

Figure 17:
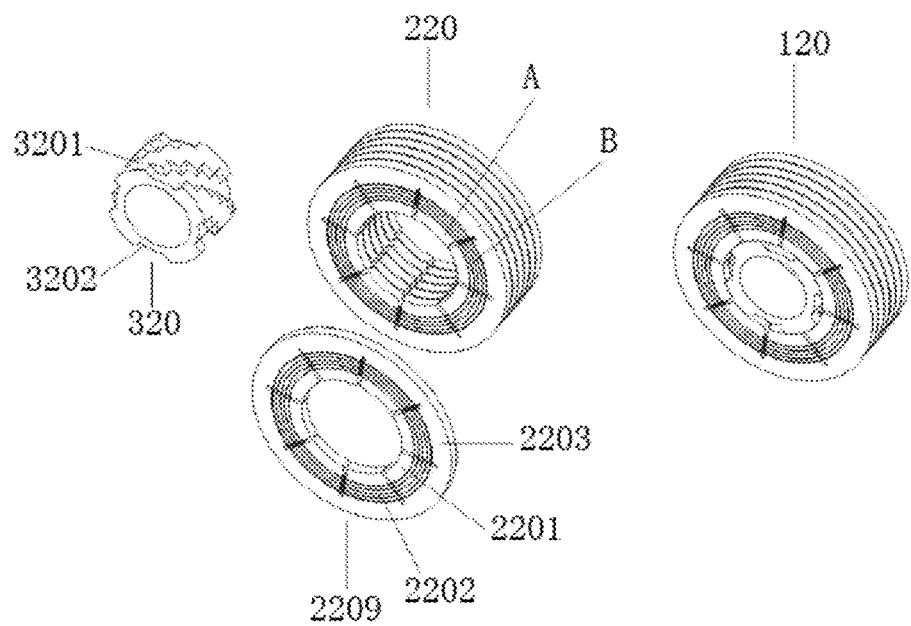
FIG. 17 is a schematic diagram of a combined structure of an eight-straight-tooth outer stator tooth pole linear arrangement switched reluctance motor member.

FIG. 17 shows an eight-straight-tooth outer stator tooth pole linear arrangement motor 120, the stator is composed of 8 straight-tooth stator tooth pole iron cores III2201 uniformly arranged along the circumference and is connected by an annular yoke X2203, a tooth pole coil 2202 is sleeved at the outside of the straight-tooth stator tooth pole iron cores III2201 to form a stator tooth pole member 2209, 6 members are linearly arranged along the axial direction to form a spiral outer stator tooth pole linear arrangement stator 220, a rotor tooth pole V320 is sleeved in the spiral outer stator tooth pole linear arrangement stator, straight-tooth tooth pole units 3201 of the rotor tooth pole V320 are spirally arranged to form an overall four-spiral rotor, and the straight-tooth tooth pole units 3201 are connected by an annular yoke I3202.

The spiral outer stator tooth pole linear arrangement stators 220 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2201A1, 2201A2, 2201A3, 2201B4, 2201B5 and 2201B6 generate a magnetic field, so that a tooth pole of the overall rotor tooth pole V320 is stressed to drive the overall rotor tooth pole V320 to rotate along a counterclockwise direction, meanwhile the columns C, D, E, F, G, H generate the same force to drive the overall rotor tooth pole V320 to rotate along the counterclockwise direction.

When the center line of the stator tooth pole of a certain first layer column A is overlapped with the center line of the corresponding rotor tooth pole unit, the 2201A1 and 2201B4 do not generate the magnetic field, the four spiral stator tooth poles 2201A2, 2201A3, 2201B5 and 2201B6 generate a magnetic field, after the overall rotor tooth pole V320 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole through a yoke to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole through an annular rotor yoke I along the two sides of the direction of the axis, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 21

Figure 18:
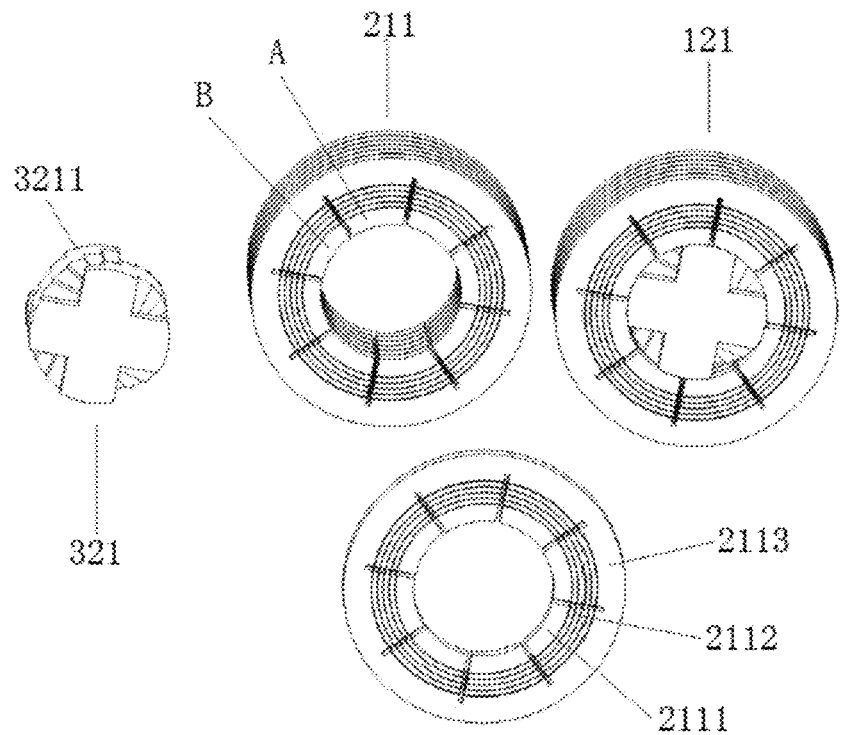
FIG. 18 is a schematic diagram of a combined structure of an eight-straight-tooth outer stator tooth pole linear arrangement switched reluctance motor member.

FIG. 18 shows an eight-straight-tooth outer stator tooth pole linear arrangement motor 121, the stator is composed of 8 straight-tooth stator tooth pole iron cores IV2211 uniformly arranged along the circumference and is connected by an annular yoke XI2213, a tooth pole coil 2212 is sleeved at the outside of the straight-tooth stator tooth pole iron cores IV2211 to form a stator tooth pole member 2219, 6 members are linearly arranged along the axial direction to form a spiral outer stator tooth pole linear arrangement stator 221, a rotor tooth pole VI321 is sleeved in the spiral outer stator tooth pole linear arrangement stator, and cross straight-tooth tooth pole units 3211 of the rotor tooth pole VI321 are spirally arranged to form an overall four-spiral rotor.

The spiral outer stator tooth pole linear arrangement stators 221 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2211A1, 2211A2, 2211A3, 2211B4, 2211B5 and 2211B6 generate a magnetic field, so that a tooth pole of the overall rotor tooth pole VI321 is stressed to drive the overall rotor tooth pole VI321 to rotate along a counterclockwise direction, meanwhile the columns C, D, E, F, G, H generate the same force to drive the overall rotor tooth pole VI321 to rotate along the counterclockwise direction.

When the center line of the stator tooth pole of a certain first layer column A is overlapped with the center line of the corresponding rotor tooth pole unit, the 2211A1 and 2211B4 do not generate the magnetic field, the four spiral stator tooth poles 2211A2, 2211A3, 2211B5 and 2211B6 generate a magnetic field, after the overall rotor tooth pole VI321 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole through a yoke to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole by passing through the rotor along the radial direction, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 22

Figure 19:
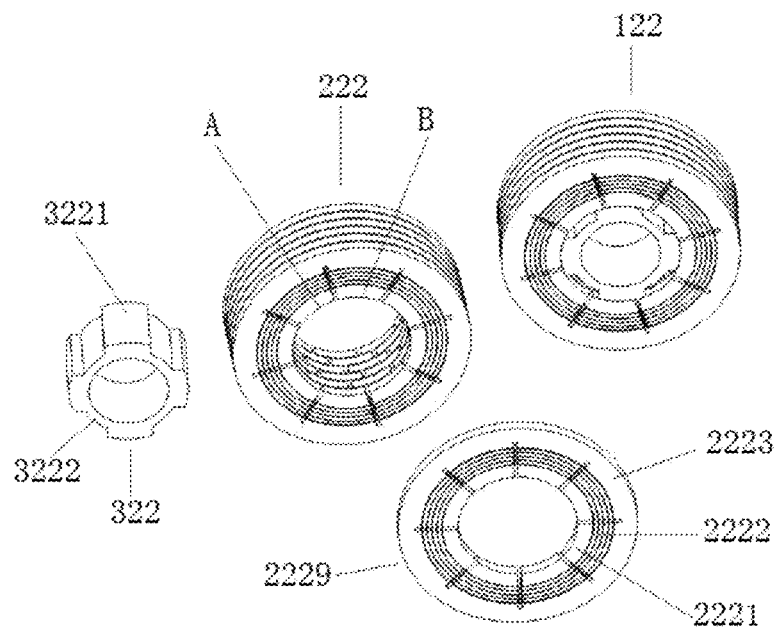
FIG. 19 is a schematic diagram of a combined structure of an eight-straight-tooth outer stator tooth pole spiral arrangement switched reluctance motor member.

FIG. 19 shows an eight-straight-tooth outer stator tooth pole spiral arrangement motor 122, the stator is composed of 8 straight-tooth stator tooth pole iron cores V2221 uniformly arranged along the circumference and is connected by an annular yoke XII2223, a tooth pole coil 2222 is sleeved at the outside of the straight-tooth stator tooth pole iron cores V2221 to form a stator tooth pole member 2229, 6 members are spirally arranged to form a spiral outer stator tooth pole spiral arrangement stator 222, a rotor tooth pole VII322 is sleeved in the spiral outer stator tooth pole spiral arrangement stator, straight-tooth tooth pole units 3221 of the rotor tooth pole VII322 are linearly arranged to form an overall four-straight-line rotor, and the straight-tooth tooth pole units 3221 are connected by an annular rotor yoke II3222.

The spiral outer stator tooth pole spiral arrangement stators 222 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2221A1, 2221A2, 2221A3, 2221B4, 2221B5 and 2221B6 generate a magnetic field, so that a tooth pole of the overall rotor tooth pole VII322 is stressed to drive the overall rotor tooth pole VII322 to rotate along a counterclockwise direction, meanwhile the columns C, D, E, F, G, H generate the same force to drive the overall rotor tooth pole VII322 to rotate along the counterclockwise direction.

When the center line of the stator tooth pole of a certain first layer column A is overlapped with the center line of the corresponding rotor tooth pole unit, the 2221A1 and 2221B4 do not generate the magnetic field, the four spiral stator tooth poles 2221A2, 2221A3, 2221B5 and 2221B6 generate a magnetic field, after the overall rotor tooth pole VII322 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole through a yoke to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole through an annular rotor yoke II along the two sides along the direction of the axis, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 23

Figure 20:
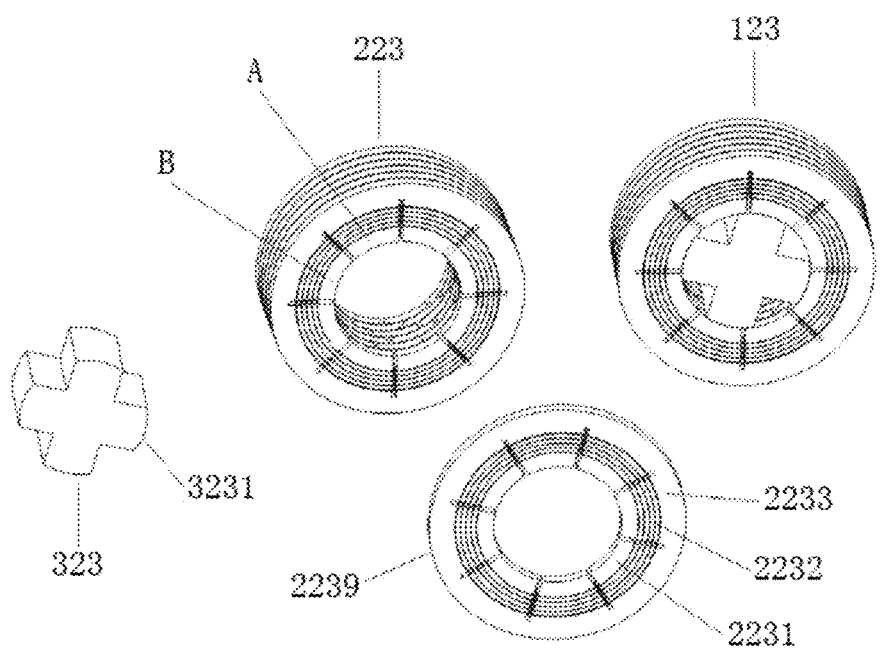
FIG. 20 is a schematic diagram of a combined structure of an eight-spiral outer stator tooth pole linear arrangement switched reluctance motor member.

FIG. 20 shows an eight-spiral outer stator tooth pole linear arrangement motor 123, the stator is composed of 8 straight-tooth stator tooth pole iron cores VI2231 uniformly arranged along the circumference and is connected by an annular yoke i2233, a tooth pole coil 2232 is sleeved at the outside of the straight-tooth stator tooth pole iron cores VI2231 to form a stator tooth pole member 2239, 6 members are spirally arranged to form a spiral outer stator tooth pole spiral arrangement stator 223, a rotor tooth pole VIII323 is sleeved in the spiral outer stator tooth pole spiral arrangement stator, and cross straight-tooth tooth pole units 3231 of the rotor tooth pole VIII323 are linearly arranged to form an overall four-straight-line rotor 323.

The spiral outer stator tooth pole spiral arrangement stators 223 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2231A1, 2231A2, 2231A3, 2231B4, 2231B5 and 2231B6 generate a magnetic field, so that a tooth pole of the overall rotor tooth pole VIII323 is stressed to drive the overall rotor tooth pole VIII323 to rotate along a counterclockwise direction, meanwhile the columns C, D, E, F, G, H generate the same force to drive the overall rotor tooth pole VIII323 to rotate along the counterclockwise direction. When the center line of the stator tooth pole of a certain first layer column A is overlapped with the center line of the corresponding rotor tooth pole unit, the 2231A1 and 2231B4 do not generate the magnetic field, the four spiral stator tooth poles 2231A2, 2231A3, 2231B5 and 2231B6 generate a magnetic field, after the overall rotor tooth pole VIII323 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole through a yoke to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole by passing through the rotor along the radial direction, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 24

Figure 21:
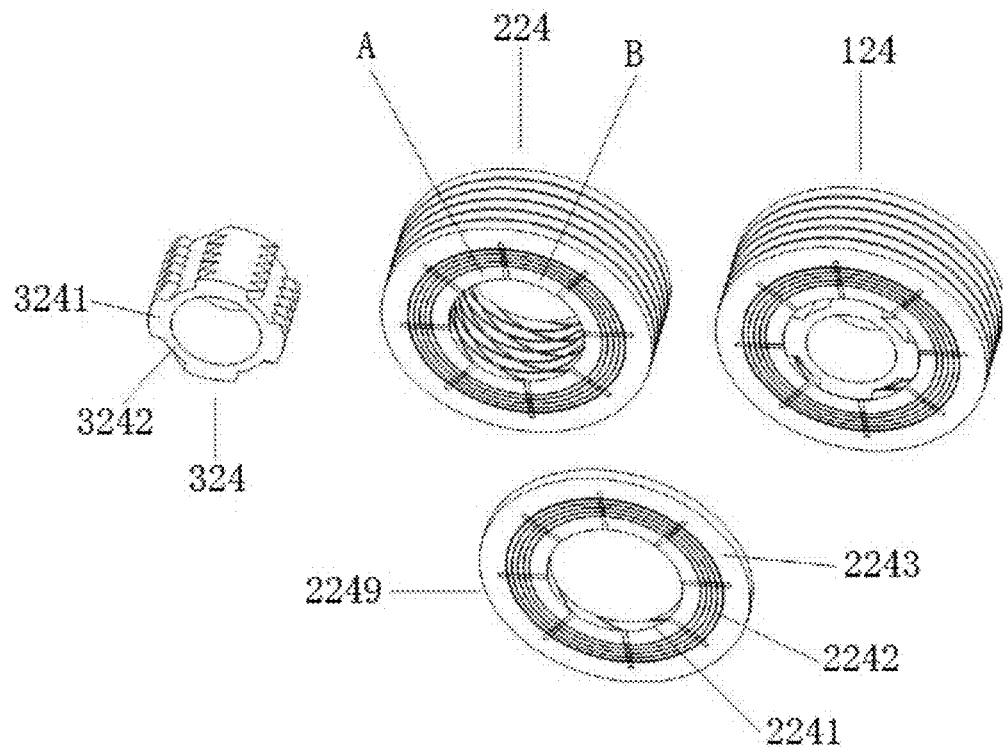
FIG. 21 is a schematic diagram of a combined structure of an eight-spiral outer stator tooth pole spiral arrangement switched reluctance motor member.

FIG. 21 shows an eight-spiral outer stator tooth pole spiral arrangement motor 124, the stator is composed of 8 spiral stator tooth pole iron cores V2241 uniformly arranged along the circumference and is connected by an annular yoke ii2243, a tooth pole coil 2242 is sleeved at the outside of the spiral stator tooth pole iron cores V2241 to form a stator tooth pole member 2249, members are spirally arranged to form a spiral outer stator tooth pole spiral arrangement stator 224, a rotor tooth pole IX324 is sleeved in the spiral outer stator tooth pole spiral arrangement stator, spiral tooth pole units 3241 of the rotor tooth pole IX324 are linearly arranged to form an overall four-straight-line rotor, and the spiral tooth pole units 3241 are connected by an annular rotor yoke III3242.

The spiral outer stator tooth pole spiral arrangement stators 224 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2241A1, 2241A2, 2241A3, 2241B4, 2241B5 and 2241B6 generate a magnetic field, so that a tooth pole of the overall rotor tooth pole IX324 is stressed to drive the overall rotor tooth pole IX324 to rotate along a counterclockwise direction, meanwhile the columns C, D, E, F, G, H generate the same force to drive the overall rotor tooth pole IX324 to rotate along the counterclockwise direction.

When the center line of the stator tooth pole of a certain first layer column A is overlapped with the center line of the corresponding rotor tooth pole unit, the 2241A1 and 2241B4 do not generate the magnetic field, the four spiral stator tooth poles 2241A2, 2241A3, 2241B5 and 2241B6 generate a magnetic field, after the overall rotor tooth pole IX324 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole through a yoke to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole through an annular rotor yoke III along the two sides of the direction of the axis, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 25

Figure 22:
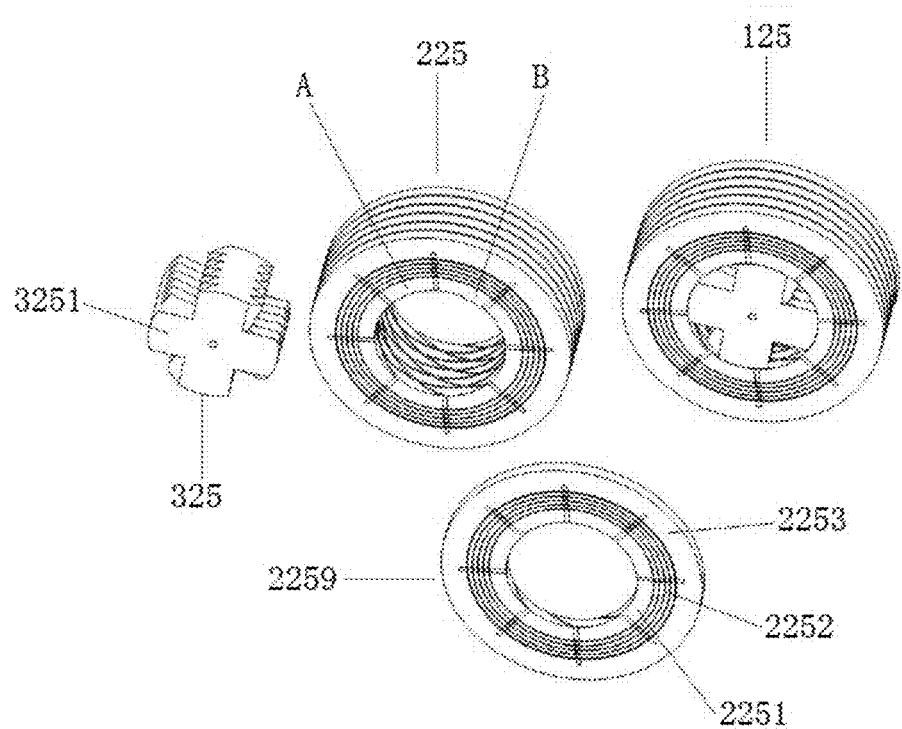
FIG. 22 is a schematic diagram of a combined structure of an eight-spiral outer stator tooth pole linear arrangement switched reluctance motor member.

FIG. 22 shows an eight-spiral outer stator tooth pole linear arrangement motor 125, the stator is composed of 8 spiral stator tooth pole iron cores V12251 uniformly arranged along the circumference and is connected by an annular yoke iii2253, a tooth pole coil 2252 is sleeved at the outside of the spiral stator tooth pole iron cores V12251 to form a stator tooth pole member 2259, 6 members are spirally arranged to form a spiral outer stator tooth pole spiral arrangement stator 225, a rotor tooth pole X 325 is sleeved in the spiral outer stator tooth pole spiral arrangement stator, and cross spiral tooth pole units 3251 of the rotor tooth pole X325 are linearly arranged to form an overall four-straight-line rotor.

The spiral outer stator tooth pole spiral arrangement stators 225 are respectively called columns A, B, C, D, E, F, G, H; the included angle between the center line of the stator tooth pole of the first layer column A and the center line of the corresponding rotor tooth pole unit are θ, θ>0°, at this time, six spiral stator tooth poles, namely, 2251A1, 2251A2, 2251A3, 2251B4, 2251B5 and 2251B6 generate a magnetic field, so that a tooth pole of the overall rotor tooth pole X325 is stressed to drive the overall rotor tooth pole X325 to rotate along a counterclockwise direction, meanwhile the columns C, D, E, F, G, H generate the same force to drive the overall rotor tooth pole X325 to rotate along the counterclockwise direction.

When the center line of the stator tooth pole of a certain first layer column A is overlapped with the center line of the corresponding rotor tooth pole unit, the 2251A1 and 2251B4 do not generate the magnetic field, the four spiral stator tooth poles 2251A2, 2251A3, 2251B5 and 2251B6 generate a magnetic field, after the overall rotor tooth pole X325 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 15°, the included angle between the center line of the stator tooth pole of the third layer column A and the center line of the corresponding rotor tooth pole unit is 30°, the included angle between the center line of the stator tooth pole of the fourth layer column A and the center line of the corresponding rotor tooth pole unit is 45°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 15°, the included angle between the center line of the stator tooth pole of the sixth layer column B and the center line of the corresponding rotor tooth pole unit is 30°, the included angle between the center line of the stator tooth pole of the first layer column B and the center line of the corresponding rotor tooth pole unit is 45°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 15°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole through a yoke to form a loop.

The two upper and lower tooth poles on the same layer point to opposite polarities of the axle end, when the other two opposite tooth poles are magnetically conductive, the magnetic line of force is divided according to the principle of the minimum magnetoresistance, when the other two opposite tooth poles are not magnetically conductive, the magnetic line of force of the stator tooth pole passes through the air gap to enter an upper rotor tooth pole, enters a lower rotor tooth pole by passing through the rotor along the radial direction, passes through the air gap between the lower rotor tooth pole and a stator tooth pole and enters a lower stator tooth pole iron core to generate a torque.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force.

Embodiment 26

Figure 23:
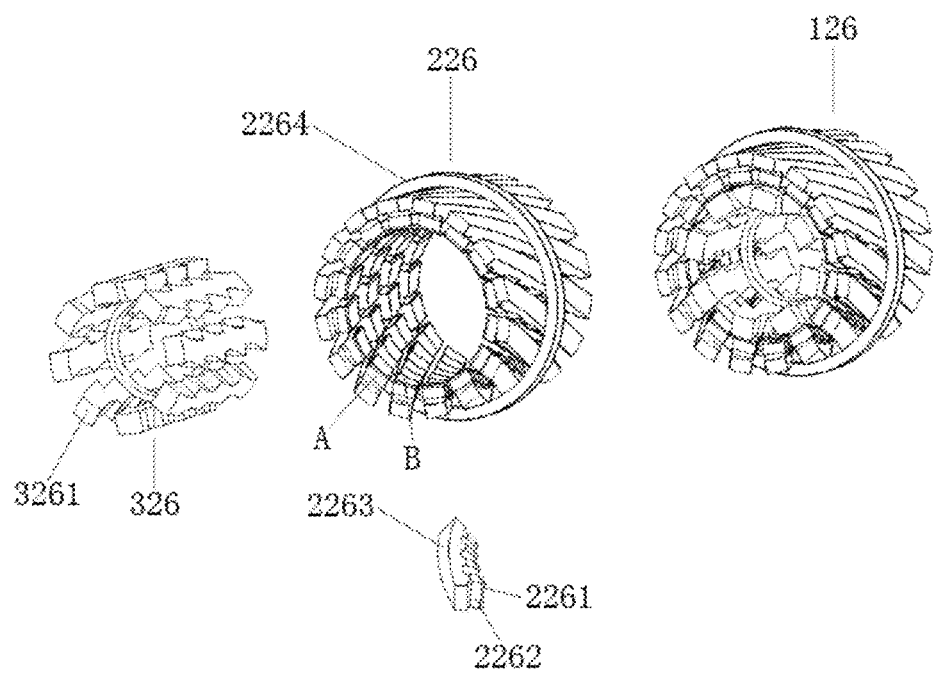
FIG. 23 is a schematic diagram of a combined structure of a sixteen-spiral outer stator tooth pole spiral arrangement switched reluctance motor member.

FIG. 23 shows a sixteen-spiral outer stator tooth pole spiral arrangement motor 126, the stator is composed of 16 spiral stator tooth pole iron cores VII2261 uniformly arranged along the circumference and is connected by a spiral yoke 2263, a tooth pole coil 2262 is sleeved at the outside of the spiral stator tooth pole iron cores VII2261, a yoke coil 2264 is sleeved on the spiral yokes 2263 between the tooth poles to form a stator tooth pole member, the members are spirally arranged to form a spiral outer stator tooth pole spiral arrangement stator 226, a rotor tooth pole XI326 is sleeved in the spiral outer stator tooth pole spiral arrangement stator, and straight-tooth tooth pole units 3261 of the rotor tooth pole XI326 are spirally arranged to form an overall eight-spiral rotor.

The spiral outer stator tooth pole spiral arrangement stators 226 are respectively called columns A, B, C, D, E, F, G, H, I, J, K, L, M, N, O, P; the included angle between the center line of the stator tooth pole of the first layer column A and the center line of the corresponding rotor tooth pole unit are θ, θ>0°, at this time, six spiral stator tooth poles, namely, 2261A1, 2261A2, 2261A3, 2261B4, 2261B5 and 2241B6 generate a magnetic field, so that a tooth pole of the overall rotor tooth pole XI326 is stressed to drive the overall rotor tooth pole XI326 to rotate along a counterclockwise direction, meanwhile the columns C, D, E, F, G, H, I, J, K, L, M, N, O, P generate the same force to drive the overall rotor tooth pole XI326 to rotate along the counterclockwise direction.

When the center line of the stator tooth pole of a certain first layer column A is overlapped with the center line of the corresponding rotor tooth pole unit, the 2251A1 and 2251B4 do not generate the magnetic field, the four spiral stator tooth poles 2251A2, 2251A3, 2251B5 and 2251B6 generate a magnetic field, after the overall rotor tooth pole XI326 turns over the interval, the six spiral stator tooth poles generate the magnetic field.

The center line of the stator tooth pole of the first layer column A is overlapped with the center line of the corresponding rotor tooth pole unit, the included angle between the center line of the stator tooth pole of the second layer column A and the center line of the corresponding rotor tooth pole unit is 7.5°, the included angle between the center line of the stator tooth pole of the third layer column A and the center line of the corresponding rotor tooth pole unit is 15°, the included angle between the center line of the stator tooth pole of the fourth layer column A and the center line of the corresponding rotor tooth pole unit is 22.5°, wherein the fourth layer column A is an equilibrium position, meanwhile, the center line of the stator tooth pole of the fourth layer column B is overlapped with the center line of the corresponding rotor tooth pole unit, the included angle between the center line of the stator tooth pole of the fifth layer column B and the center line of the corresponding rotor tooth pole unit is 7.5°, the included angle between the center line of the stator tooth pole of the sixth layer column B and the center line of the corresponding rotor tooth pole unit is 15°, the included angle between the center line of the stator tooth pole of the first layer column B and the center line of the corresponding rotor tooth pole unit is 22.5°, wherein the first layer column B is the equilibrium position, during the initial start, the second layer column A and the third layer column A need to generate the magnetic force separately or together, the fifth layer column B and the sixth layer column B generate the magnetic force separately or together, so that the fourth layer column A deviates from the equilibrium position, the first layer column B deviates from the equilibrium position, after the rotation, the fourth layer column A and the first layer column B can be magnetized at the equilibrium position to generate the magnetic force, that is, 6 layers can be arranged and combined to generate the magnetic force, so there are multiple control modes, and after rotating 7.5°, the circulation is repeated.

When only one layer is magnetically conductive, if two upper and lower tooth poles on the same layer point to the same polarity of the axle end, when the magnetic line of force of the stator tooth pole passes through the air gap, the magnetic line of force enters the adjacent rotor unit along the two sides of the direction of the rotation axis after entering the corresponding rotor unit, then enters the adjacent stator tooth pole from the adjacent rotor unit by passing through the air gap, and then enters a magnetic conduction stator tooth pole through a yoke to form a loop.

The two upper and lower tooth poles on the same layer point to opposite polarities of the axle end, when the other 6 opposite tooth poles are magnetically conductive, the magnetic line of force is divided according to the principle of the minimum magnetoresistance, when the other 6 opposite tooth poles are not magnetically conductive, the magnetic line of force of the stator tooth pole passes through the air gap to enter an upper rotor tooth pole, enters a lower rotor tooth pole through a yoke, passes through the air gap between the lower rotor tooth pole and a stator tooth pole and enters a lower stator tooth pole iron core to generate a torque.

Figure 24:
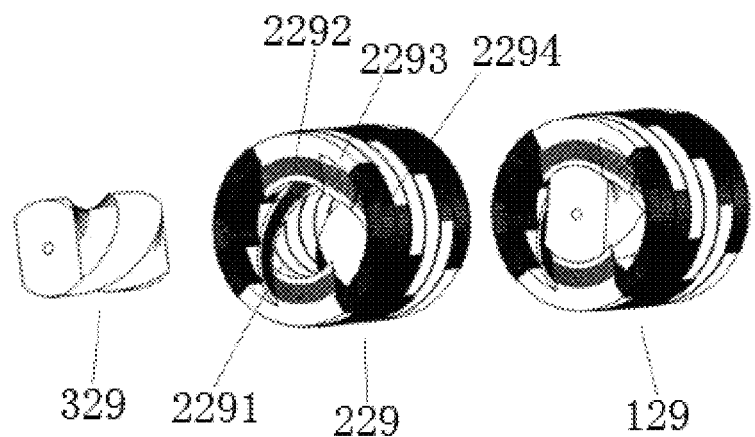
FIG. 24 is a schematic diagram of a combined structure of a spiral tooth pole spiral arrangement inner reverse spiral motor member.

When two layers are magnetically conductive at the same time, the magnetic directions of the two adjacent stator tooth poles are opposite, in this way, the magnetic line of force passes through the air gap from the stator tooth pole to enter the corresponding rotor tooth pole unit, then enters the adjacent rotor tooth pole unit along the direction of the axis, and passes through the air gap to enter the adjacent stator tooth pole, and the stator tooth pole forms a closed loop starting from the arrival magnetic line of force Embodiment 27 as shown in FIG. 24, two spiral tooth pole iron cores 2291 are arranged oppositely along the circumference, the yokes of the two spiral tooth pole iron cores 2291 are connected by an annular yoke iv2293, a tooth pole coil 2292 is sleeved on the spiral tooth pole iron cores 2291, a yoke coil 2294 is sleeved on the yoke 2293 between the spiral tooth pole iron cores 2291 to form a halbach array spiral tooth pole stator member, the halbach array spiral tooth pole stator members are spirally arranged along the rotation axis to form a halbach array spiral tooth pole spiral arrangement stator 229, a reverse double-spiral tooth pole rotor is arranged in the halbach array spiral tooth pole spiral arrangement stator, a reverse spiral rotor motor is arranged in the halbach array spiral tooth pole spiral arrangement stator 229, the screw pitch of the halbach array spiral tooth pole spiral arrangement is 660 mm, the length is 330 mm, the screw pitch of the reverse double-spiral tooth pole rotor is 660 mm, the length is 330 mm, only the screw pitch directions are reverse, in this way, the three layers of halbach array spiral tooth pole stator members can keep continuous rotation once rotating 60°, and six layers are equivalent that reverse spiral motors in the two three-layer halbach array spiral tooth pole spiral arrangement are connected in series.

The power converter, controller, rotor position detector and the like of the existing switched reluctance motor speed control system can be applied to the present invention through adaptive modification.

Numerical values and data disclosed in the patent, such as the screw pitch, the width, the height and the like merely illustrate the structural features and are used as limitations of the present invention.

Figure 26:
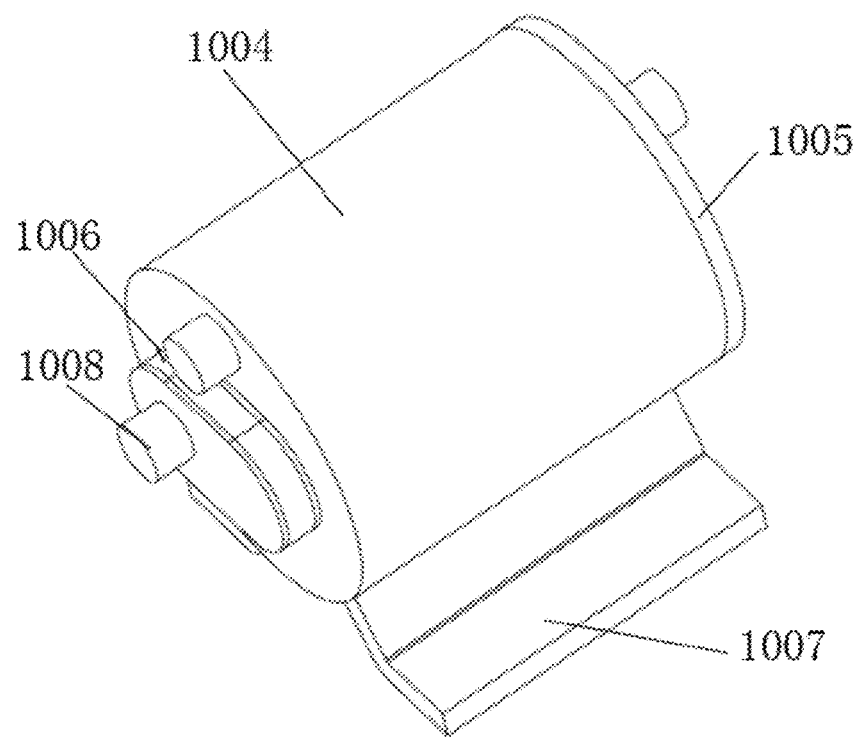
FIG. 26 is a structural schematic diagram of a double-screw pump motor.

A two-way double-screw pump motor includes a first spiral strip-shaped rotor switched reluctance motor, the rotor of the first spiral strip-shaped rotor switched reluctance motor is used as a first driving screw of a double-screw pump, an annular stator side opening portion of the motor and the first driving screw cooperate with another screw to constitute the two-way double-screw pump motor, and the stator is filled with resin to form a circular ring inner surface. The resin is not magnetically conductive and has no impact on the operation of the motor. The purpose of adding the resin is to make the interior of the stator fit the shape of the screw. As shown in FIG. 26, end covers 1005 are arranged on the two ends of the two-way double-screw pump, holes matched with the first driving screw and the other screw are formed in the end covers 1005, and oil inlets and oil outlets are respectively formed in the end covers 1005. The remaining structure of the two-way double-screw pump motor is the same as that of the existing double-screw pump. An output shaft 1008 is inserted on the rotor of the motor. The two-way means that the motor can be used as a motor and a pump.

The other screw is the rotor of a second spiral strip-shaped rotor switched reluctance motor and serves as a second driving screw, a corresponding side of the second spiral strip-shaped rotor switched reluctance motor is open, so that the first driving screw is engaged with the second driving screw, that is, the spiral direction of the second driving screw is opposite to the spiral direction of the first driving screw.

The other screw is a driven screw.

The number of tooth poles of the spiral strip-shaped rotor switched reluctance motor is one of 1-8 tooth poles.

Figure 25:
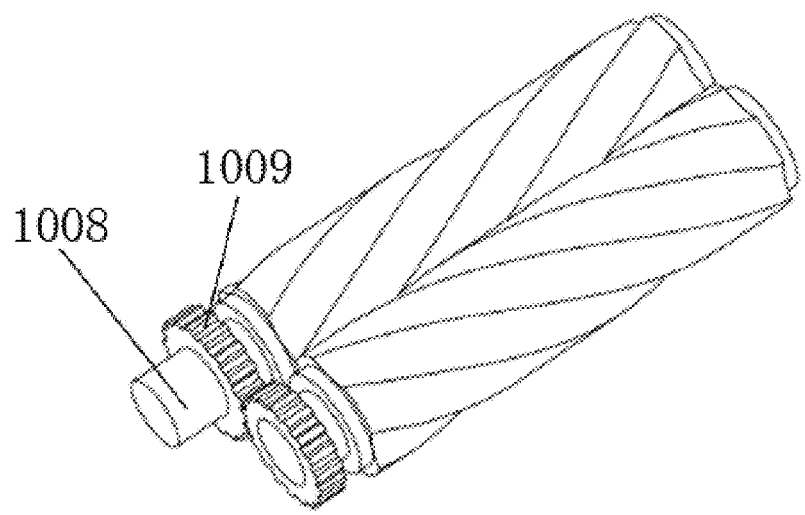
FIG. 25 is an engagement schematic diagram of double screws.

As shown in FIG. 25, gears engaged with each other are arranged on the end parts of the two screws.

In an electric vehicle, the double-screw pump motor is used as a wheel side motor of the electric vehicle, and the motors are connected through oil circuits, so that the motors can transfer energy to each other through the two-way double-screw pump. An output shaft of the double-screw pump motor is connected with a rotating shaft of the electric vehicle.

The two-way double-screw pump motor is one of a front drive, a rear drive or a four-wheel drive of the electric vehicle.

Figure 31:
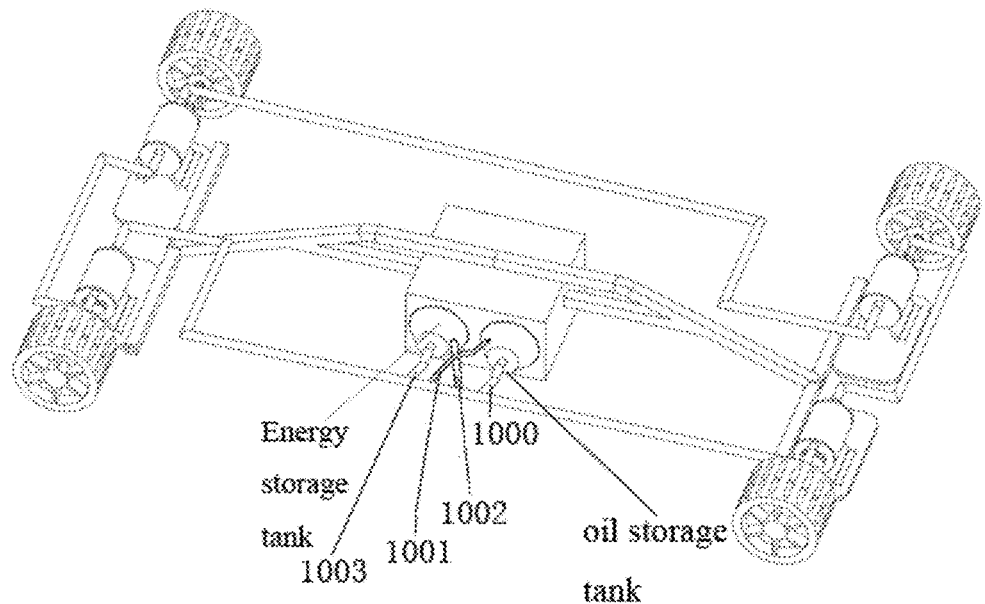
FIG. 31 is a first installation schematic diagram of a double-screw pump motor on a vehicle frame.
Figure 32:
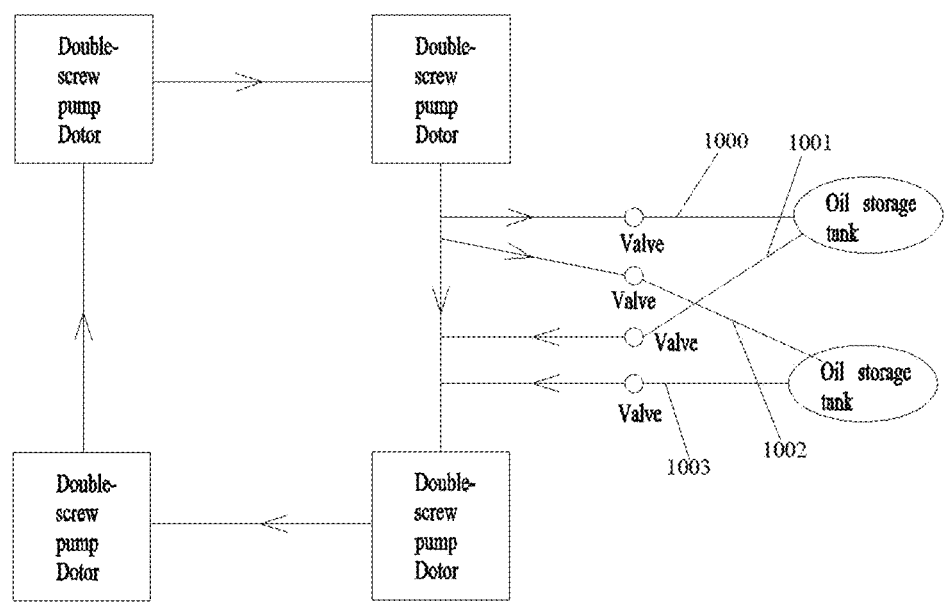
FIG. 32 is a schematic diagram of oil circuit circulation between double-screw pump motors in FIG. 31.

The two-way double-screw pumps between electric vehicle motors are connected in series through the oil circuits to realize the mutual transmission of energy, the serial connection mode between the two-way double-screw pumps is as follows: the output end of the first motor is connected with the input end of the next motor through an oil circuit and then is connected in series in turn, and the output end of the last motor is connected with the input end of the first motor through an oil circuit; an oil storage tank and an energy storage tank are connected on a branch oil circuit between the two motors, an oil inlet pipe 1000 and an oil outlet pipe 1001, which are connected with the oil circuit, are arranged on the oil storage tank, and an energy storage pipe 1002 and an energy release pipe 1003, which are connected with the oil circuit, are arranged on the energy storage tank; the forward direction during the circulation of the oil circuit is used as the front direction, the oil outlet pipe 1001 is arranged in front of the energy storage pipe 1002 on an interface of the oil pipe, the energy release pipe 1003 is arranged in front of the oil inlet pipe 1000, and switch valves are arranged on the oil inlet pipe 1000, the oil outlet pipe 1001, the energy storage pipe 1002, the energy release pipe 1003 and on the oil circuit connected with the branch oil circuit. FIG. 31 is a schematic diagram of a serial connection mode between the motors, and FIG. 32 is a schematic diagram of oil circuit circulation of the connection mode.

The oil circuit circulation method of the two-way double-screw pumps connected in series is as follows:

1. In a normal working state of the two-way double-screw pumps, when the vehicle is running normally, the oil circuit connected between the two-way double-screw pump motor and the motor is filled with oil, the hydraulic oil circulates on the serial oil circuits among the motors, the switch valves on the oil inlet pipe 1000, the oil outlet pipe 1001, the energy storage pipe 1002 and the energy release pipe 1003 are closed, and the switch valve on the oil circuit connected with the branch oil circuit is opened; when the vehicle is braked, the motor is de-energized, the switch valves on the oil outlet pipe 1001 of the oil storage tank and on the energy storage pipe 1002 of the energy storage tank are opened, the switch valve on the oil circuit connected with the branch oil circuit is closed, the inertia of the vehicle drives the motor to work as an oil pump, the output high pressure oil enters an energy accumulator for storing energy, and the lacking hydraulic oil in the oil pipe is replenished by the oil storage tank;

when the vehicle is started, as large power is required, at this time, the switch valves on the energy release pipe 1003 and the oil outlet pipe 1001 can be opened, the energy stored in the energy storage tank is released, the motor works as a motor to provide starting power to reduce the power consumption of the motor, if the stored energy is used up, it is driven by the motor, and redundant hydraulic oil in the oil circuit enters the oil storage tank; and 2. when a part of two-way double-screw pumps is subjected to failure and outage, the hydraulic oil circulating among the remaining motors drives the screws of the motor to rotate to realize energy replenishment.

Figure 33:
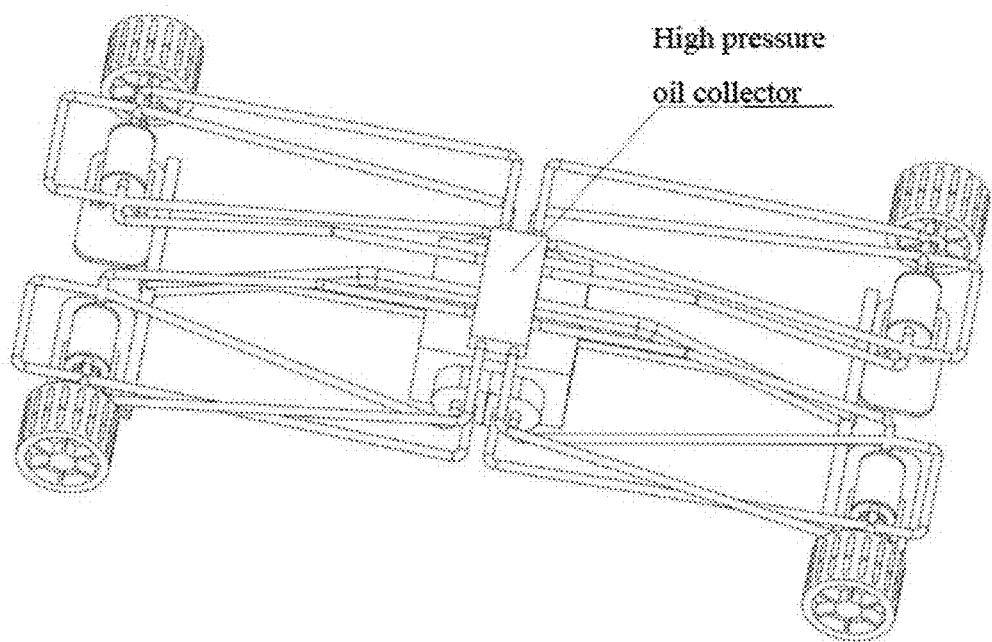
FIG. 33 is a second installation schematic diagram of a double-screw pump motor on a vehicle frame.
Figure 34:
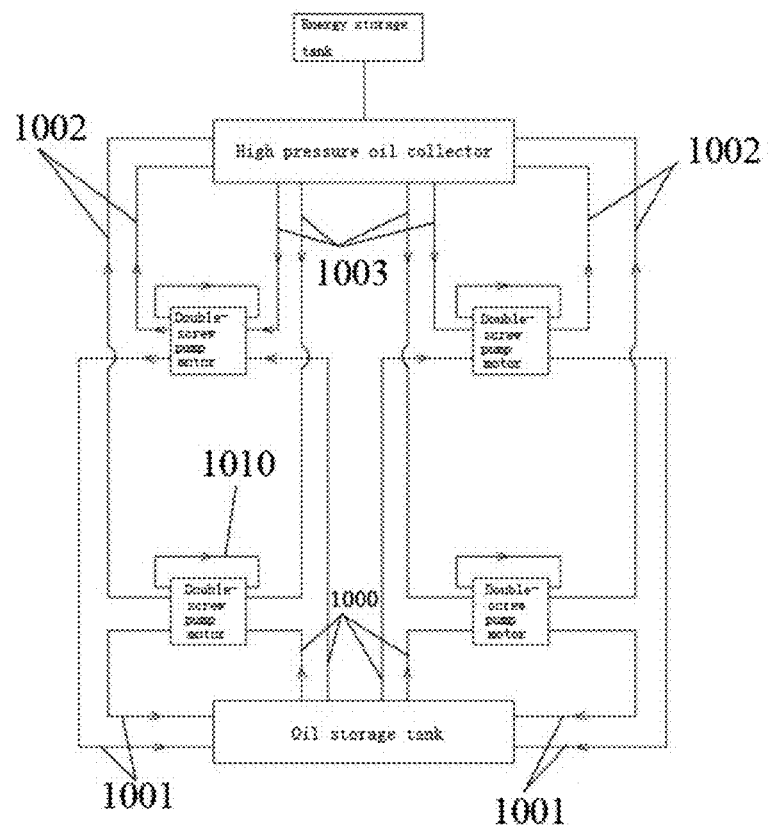
FIG. 34 is a schematic diagram of oil circuit circulation between double-screw pump motors in FIG. 33.

The front drive, the rear drive or the four-wheel drive includes the two-way double-screw pump motors, a high pressure oil collector, an energy accumulator and the oil storage tank, each motor is provided with a self-circulating oil circuit 1010, the output end of each motor is connected with the energy storage pipe 1002 through the high pressure oil collector, the input end of each motor is connected with the high pressure oil collector through the energy release pipe 1003, the output end of each motor is connected with the oil storage tank through the oil outlet pipe 1001, the input end of each motor is connected with the oil storage tank through the oil inlet pipe 1000, the high pressure oil collector is connected with the energy storage tank, and switch valves are arranged on the oil inlet pipe 1000, the oil outlet pipe 1001, the energy storage pipe 1002, the energy release pipe 1003, the self-circulating oil circuits 1010 of the motors and a high pressure oil collection pipe. FIG. 33 is a schematic diagram of a serial connection mode between the motors, and FIG. 34 is a schematic diagram of oil circuit circulation of the connection mode.

The high pressure oil collector is a cavity, when all switch valves on the pipelines communicating with the high pressure oil collector are opened, the hydraulic oil flowing into the high pressure oil collector is collected in the high pressure oil collector, and then is shunted by the high pressure oil collector.

The circulation method among the oil circuits is as follows:

1. In the normal working state of the two-way double-screw pumps, the motors and the connected oil pipes are filled with oil;

when the vehicle is running normally, the switch valves on the self-circulating oil circuits of the motors are opened, the remaining switch valves are closed, and the motors run normally through the respective self-circulating oil circuits;

when the vehicle is braked during walking, the motors are de-energized, and the switch valves on the oil inlet pipes 1000 connected to the motors of the oil storage tank are opened, the switch valves on the energy storage pipes 1002 of the motors connected with the high pressure oil collector are opened, the switch valve on the oil circuit of the high pressure oil collector connected with the energy storage tank is opened, and the switch valves on the remaining connection circuits are closed; at this time, the vehicle continues to walk under the effect of inertia, so that the motor works as the oil pump, the output high pressure oil enters the energy storage tank through the high pressure oil collector, and the lacking oil in the oil pipes is replenished from the oil tank;

when the vehicle is started, as large power is required, the energy storage tank communicates with the high pressure oil collector, the switch valves on the energy release pipes of the high pressure oil collector connected with the motors are opened, the switch valves on the oil outlet pipes 1001 of the motors connected with the oil storage tank are opened, the energy in the energy storage tank is released, and the motor works as a motor to provide starting power to reduce the power consumption of the motor, if the stored energy is used up, the motors are singly driven circularly, and the redundant hydraulic oil in the oil circuit enters the oil storage tank; and 2. when a part of two-way double-screw pumps is subjected to failure and outage, the switch valves on the energy storage tubes 1002 of the remaining motors connected with the high pressure oil collector are opened, and the switch valves on the oil inlet pipe 1000 connected with the oil storage tank is opened, the switch valve on the energy release pipe 1003 of the high pressure oil collector connected with the faulty motor is opened, the oil outlet pipe 1001 of the faulty motor communicates with the oil storage tank, if the pressure in the high pressure oil collector is lower than the pressure required by the faulty motor, the high pressure oil collector communicates with the energy storage tank, the energy storage tank releases pressure for energy replenishment, if the pressure in the high pressure oil collector is higher than the pressure required by the faulty motor, the high pressure oil collector communicates with the energy storage tank, and the storage tank stores energy.

The motor includes a motor housing 1004 matched with the stator, end covers 1005 are arranged at both ends of the motor housing 1004, holes matched with an output shaft 1008 is formed in the end covers 1005, and oil inlets and oil outlets connected with the oil pipes are further formed in the end covers 1005.

The gears 1009 on two screw shafts are arranged on the outer sides of the end covers 1005, and gear boxes 1006 are sleeved at the outer sides of the gears 1009. A support 1007 is arranged on the motor housing 1004, and the support 1007 is used for mounting and fixing the motor.

Figure 29:
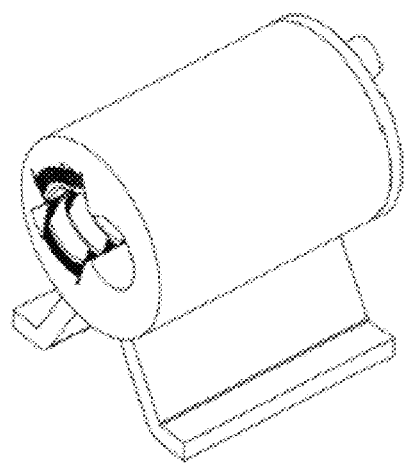
FIG. 29 is a schematic diagram of a shell of a double-screw pump motor of a driving screw.

As shown in FIG. 29, a stator is arranged on one side of the motor housing 1004, a spiral rotor serves as a driving shaft, and the other spiral rotor serves as a driven shaft.

Figure 27:
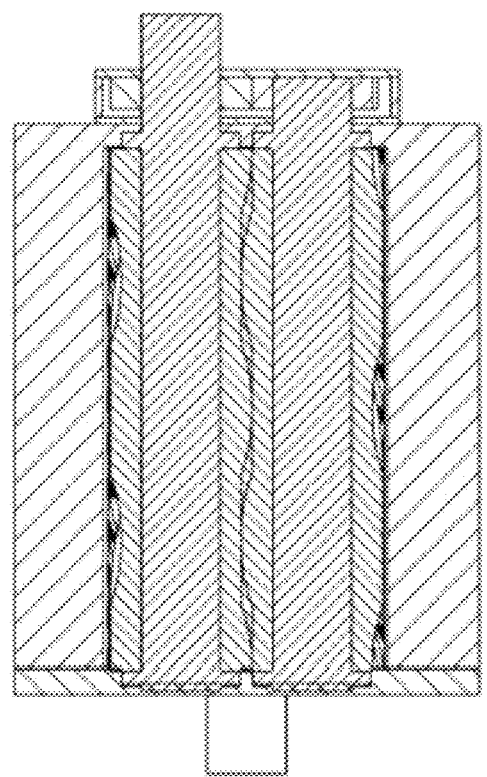
FIG. 27 is an axial section view of a double-screw pump motor.
Figure 28:
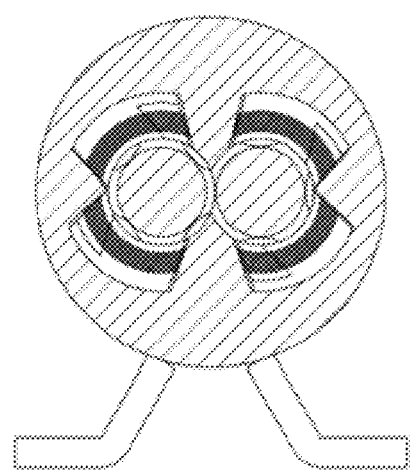
FIG. 28 is a first radial sectional view of a double-screw pump motor.
Figure 30:
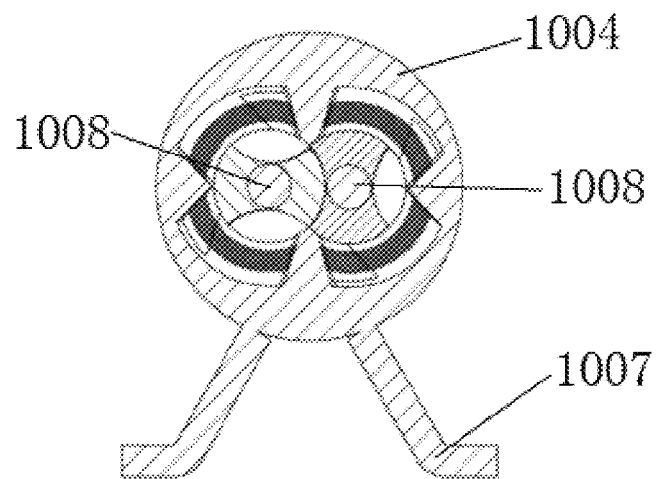
FIG. 30 is a second radial sectional view of a double-screw pump motor.

As shown in FIG. 27, FIG. 28 and FIG. 30, stators are uniformly distributed in the motor housing 1004, and two spiral rotors serve as driving shafts.

In FIG. 30, the stator is composed of 4 tooth poles, and the rotor is composed of 4 tooth poles.

Figure 42:
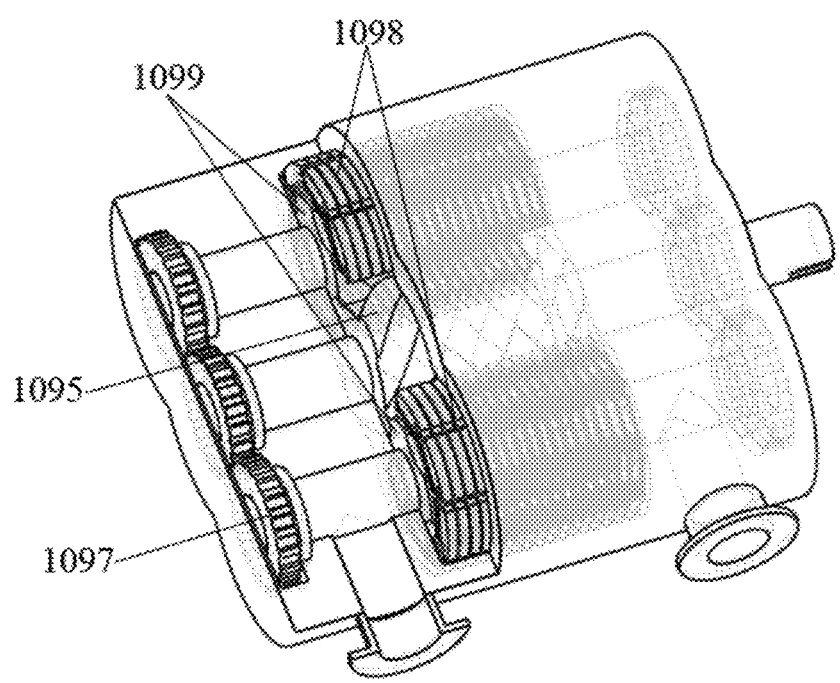
FIG. 42 is a structural schematic diagram of a composite pump of a three-screw pump and a spiral rotor switched reluctance motor.
Figure 43:
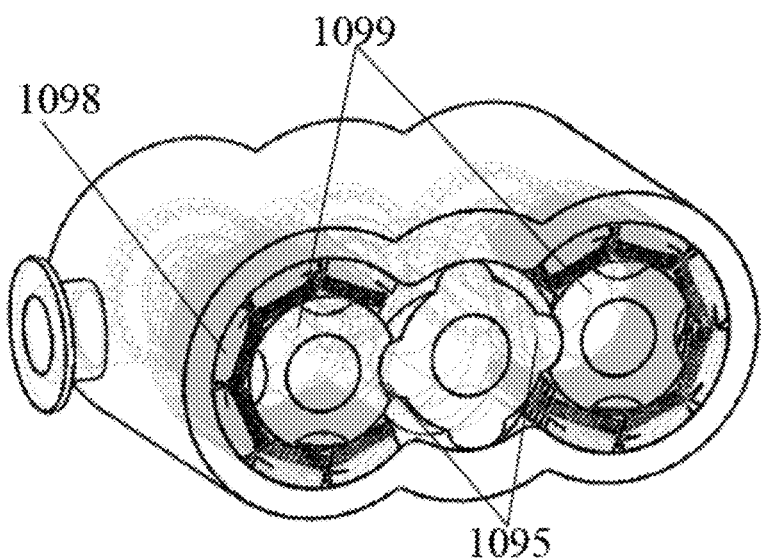
FIG. 43 is a sectional view of a composite pump of a three-screw pump and a spiral rotor switched reluctance motor.

A composite pump of a three-screw pump and a spiral rotor switched reluctance motor includes the three-screw pump, at least one of three screws of the three-screw pump is a spiral rotor 1099 of the spiral rotor switched reluctance motor, a bushing of the three-screw pump corresponding to the spiral rotor 1099 is a stator bushing 1098 formed by a stator of the spiral rotor switched reluctance motor, and the spiral rotor 1099 and the stator bushing 1098 constitute the spiral rotor switched reluctance motor. A gap between tooth poles of the stator of the spiral rotor switched reluctance motor is filled with resin, for example, epoxy resin, of course, can be other oil resistant resin, to form the stator bushing 1098, as shown in FIG. 42 to FIG. 43.

Synchronous gears 1097 are arranged among the three screws.

A thin rubber layer is arranged on an outer surface of the screw.

The three screws are double-ended threads to four-ended threads, and when the double-ended thread is used as the rotor, it corresponds to four stators; when a three-ended thread is used as the rotor, it corresponds to four stators or 6 stators; and when the four-ended thread is used as the rotor, it corresponds to 8 stators.

If the middle screw among the three screws is the spiral rotor, then the middle screw is a driving screw.

If two screws on both sides among the three screws are spiral rotors, then the two screws on both sides are driving screws.

If the three screws are spiral rotors, then the three screws are driving screws.

Synchronous gears for supporting the bearings of the three screws and the three screws are arranged at the outside of a working cavity formed by the screws and the bushing, and in this way, the metal chips generated by friction can be prevented from being attached to the spiral rotor and the stator bushing.

In an electric vehicle, the composite pump of the three-screw pump and the spiral rotor switched reluctance motor is used as a wheel side motor of the electric vehicle, and the wheel side motors communicate with each other through oil circuits, so that the wheel side motors can transfer energy to each other through the oil circuit.

The wheel side motor is a front drive or a rear drive of the electric vehicle, and two wheel side motors of the front drive or the rear drive communicate with an oil storage tank and an energy storage tank through oil circuits; by means of valve control, (1) two wheel side motors are placed between the oil storage tank and the energy storage tank after being connected in parallel, and the three components are connected in series. During braking, high pressure oil flowing from the composite pump enters the energy storage tank, hydraulic oil lacking in the composite pump is provided by the oil storage tank, during startup or acceleration, if the energy storage tank stores energy, hydraulic oil in the energy storage tank is released to the composite pump to provide energy, redundant hydraulic oil enters the oil storage tank, so that the energy is stored during braking, and the energy is released during startup or acceleration; (2) after the two wheel side motors are connected in series, the two ends are respectively connected with the oil storage tank and the energy storage tank in series, so that the energy is stored during braking, and the energy is released during startup or acceleration; and (3) the two wheel side motors are connected in series circularly, namely, the heads and tails of the two wheel side motors are connected with each other.

Figure 35:
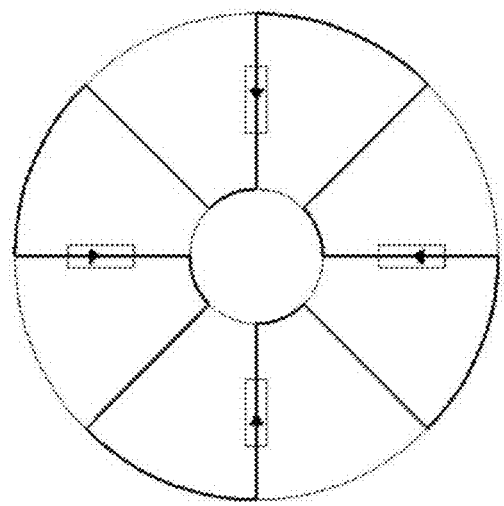
FIG. 35 is a first schematic diagram of circulation of a screw pump motor.
Figure 36:
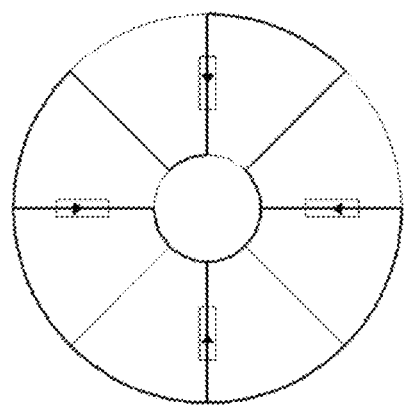
FIG. 36 is a second schematic diagram of circulation of a screw pump motor.
Figure 37:
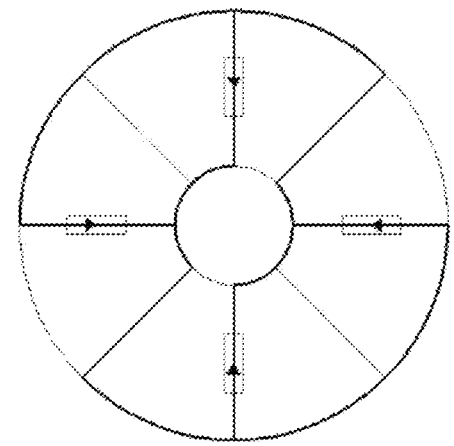
FIG. 37 is a third schematic diagram of circulation of a screw pump motor.
Figure 38:
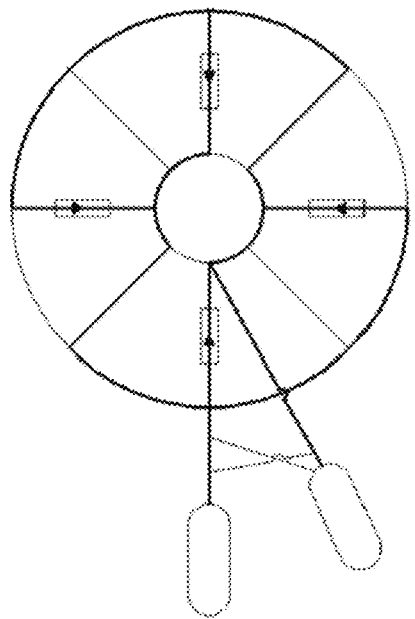
FIG. 38 is a fourth schematic diagram of circulation of a screw pump motor.
Figure 39:
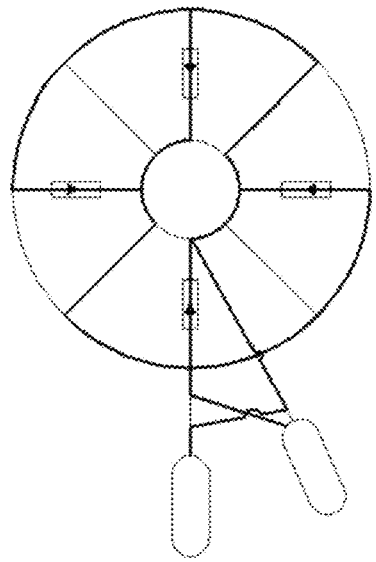
FIG. 39 is a fifth schematic diagram of circulation of a screw pump motor.
Figure 40:
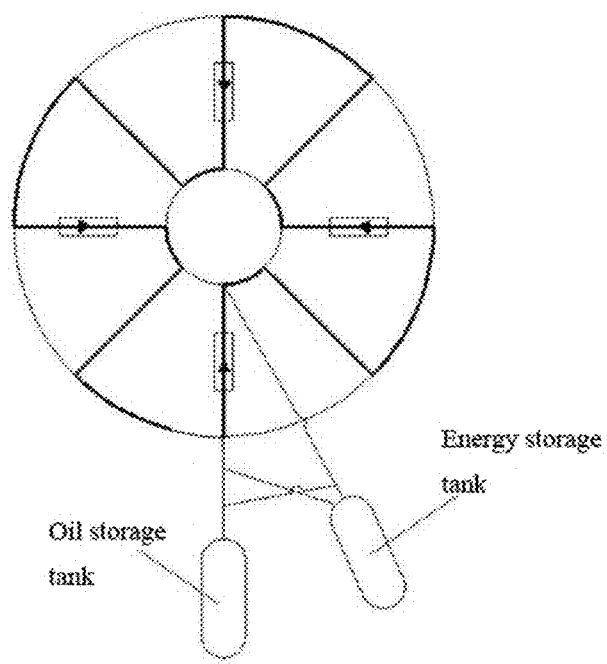
FIG. 40 is a sixth schematic diagram of circulation of a screw pump motor.
Figure 41:
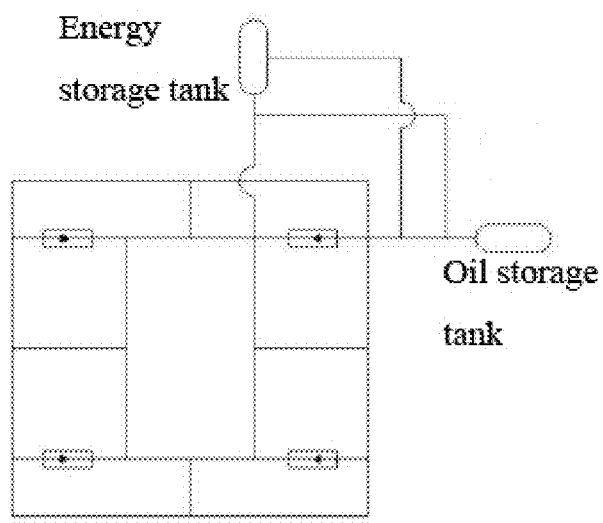
FIG. 41 is a schematic diagram of oil circuit connection of a four-wheel-drive wheel side motor.

The wheel side motors are wheel side motors of a four-wheel-drive electric vehicle, four wheel side motors communicate with the oil storage tank and the energy storage tank through oil circuits, by means of valve control, (1) the four wheel side motors are connected in parallel circularly and are disconnected with the oil storage tank and the energy storage tank, as shown in FIG. 35, in FIG. 35 to FIG. 45, a thick solid line represents the oil circuit for the flow of the hydraulic oil, a thin solid line represents the oil circuit in which the hydraulic oil does not flow, a square box represents the wheel side motor, and an arrow represents the flow direction of the hydraulic oil; (2) any three wheel side motors are circularly connected with the other wheel side motor in series after being connected in parallel and are disconnected with the oil storage tank and the energy storage tank, as shown in FIG. 36; (3) the four wheel side motors constitute a bridge circuit, constitute circulation and are disconnected with the oil storage tank and the energy storage tank, the bridge circuit refers to that the four wheel side motors are divided into two groups, two adjacent wheel side motors are located in a group, the two wheel side motors in each group of wheel side motors are connected in parallel, and the two groups of wheel side motors are connected in series, as shown in FIG. 37; and (4) the four wheel side motors are connected in series or any three wheel side motors are circularly connected with the other wheel side motor in series after being connected in parallel, or the four wheel side motors are placed between the oil storage tank and the energy storage tank after constituting the bridge circuit, and the three components are connected in series, so that the energy is stored during braking, and the energy is released during startup or acceleration, as shown in FIG. 38 to FIG. 46, FIG. 38 displays the high pressure oil generated by the composite pump enters the energy storage tank for storing the energy during the braking, and the hydraulic oil in the composite pump is supplemented by the oil storage tank, and FIG. 39 displays that the energy storage tank releases energy, and the redundant hydraulic oil enters the oil storage tank during the start or acceleration. Rectangular framework and arrows in the figures indicate the wheel side motors.

The above description are only preferred embodiments of the present invention, and it should be pointed out that those skilled in the art can make several changes and improvements without departing from the overall concept of the present invention, and these changes and improvements should also be considered as the protection scope of the present invention.

The invention claimed is:

1. A composite pump of a three-screw pump and a spiral rotor switched reluctance motor, comprising the three-screw pump, wherein at least one of three screws of the three-screw pump is a spiral rotor of the spiral rotor switched reluctance motor, a bushing of the three-screw pump corresponding to the spiral rotor is a stator bushing formed by a stator of the spiral rotor switched reluctance motor, and the spiral rotor and the stator bushing constitute the spiral rotor switched reluctance motor.

2. An electric vehicle using the composite pump of the three-screw pump and the spiral rotor switched reluctance motor according to claim 1, wherein the composite pump serves as a wheel side motor of the electric vehicle, and the wheel side motors communicate with each other through oil circuits, so that the wheel side motors can transfer energy to each other through the oil circuit.

3. The electric vehicle according to claim 2, wherein the wheel side motor is a front drive or a rear drive of the electric vehicle, and two wheel side motors of the front drive or the rear drive communicate with an oil storage tank and an energy storage tank through oil circuits; by means of valve control, a, two wheel side motors are placed between the oil storage tank and the energy storage tank after being connected in parallel, and the three components are connected in series, so that the energy is stored during braking, and the energy is released during startup or acceleration; b, after the two wheel side motors are connected in series, the two ends are respectively connected with the oil storage tank and the energy storage tank in series, so that the energy is stored during braking, and the energy is released during startup or acceleration; and c, the two wheel side motors are connected in series circularly, namely, the heads and tails of the two wheel side motors are connected with each other.

4. The electric vehicle according to claim 3, wherein the wheel side motors are wheel side motors of a four-wheel-drive electric vehicle, four wheel side motors communicate with the oil storage tank and the energy storage tank through oil circuits, by means of valve control, a, the four wheel side motors are connected in parallel circularly and are disconnected with the oil storage tank and the energy storage tank; b, any three wheel side motors are circularly connected with the other wheel side motor in series after being connected in parallel and are disconnected with the oil storage tank and the energy storage tank; c, the four wheel side motors constitute a bridge circuit, constitute circulation and are disconnected with the oil storage tank and the energy storage tank; and d, the four wheel side motors are connected in series, or any three wheel side motors are connected with the other wheel side motor in series after being connected in parallel, or the four wheel side motors are placed between the oil storage tank and the energy storage tank after constituting the bridge circuit, and the three components are connected in series, so that the energy is stored during braking, and the energy is released during startup or acceleration.

* * * * *